United States Patent
Chaganti et al.

(10) Patent No.: US 11,218,378 B1
(45) Date of Patent: Jan. 4, 2022

(54) CLUSER-AWARE NETWORKING FABRIC UPDATE SYSTEM

(71) Applicant: Dell Products L.P., Round Rock, TX (US)

(72) Inventors: Ravikanth Chaganti, Bangalore (IN); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/019,790

(22) Filed: Sep. 14, 2020

(51) Int. Cl.
*G06F 15/173* (2006.01)
*H04L 12/24* (2006.01)
*G06F 8/65* (2018.01)

(52) U.S. Cl.
CPC .............. *H04L 41/147* (2013.01); *G06F 8/65* (2013.01); *H04L 41/0893* (2013.01); *H04L 41/12* (2013.01)

(58) Field of Classification Search
CPC ... H04L 41/147; H04L 41/0893; H04L 41/12; G06F 8/65
See application file for complete search history.

(56) References Cited

U.S. PATENT DOCUMENTS

| 7,779,045 B2 | 8/2010 | Mohamed et al. |
| 9,170,852 B2 | 10/2015 | Thompson et al. |
| 2018/0241617 A1* | 8/2018 | Radzikowski .......... G06F 8/656 |

* cited by examiner

*Primary Examiner* — Wing F Chan
*Assistant Examiner* — Joseph R Maniwang
(74) *Attorney, Agent, or Firm* — Joseph Mencher

(57) ABSTRACT

A networking fabric update system includes a cluster coordination subsystem coupled to servers and switches. The cluster coordination subsystem identifies a networking topology provided by connections between the servers and switches, and forecasts workload operations for the servers based on, for example, current workload operations and historical workload operations of the servers. Based on the networking topology and the workload operations forecast for the servers, the cluster coordination subsystem updates a first subset of the switches and, following the updating of the first subset of the switches, updates a second subset of the switches. The updating of the first subset of the switches may include determining that current workload operations for the servers during a current time period are above a workload threshold for the first subset of the switches, and scheduling and updating the first subset of the switches during a subsequent time period.

20 Claims, 16 Drawing Sheets

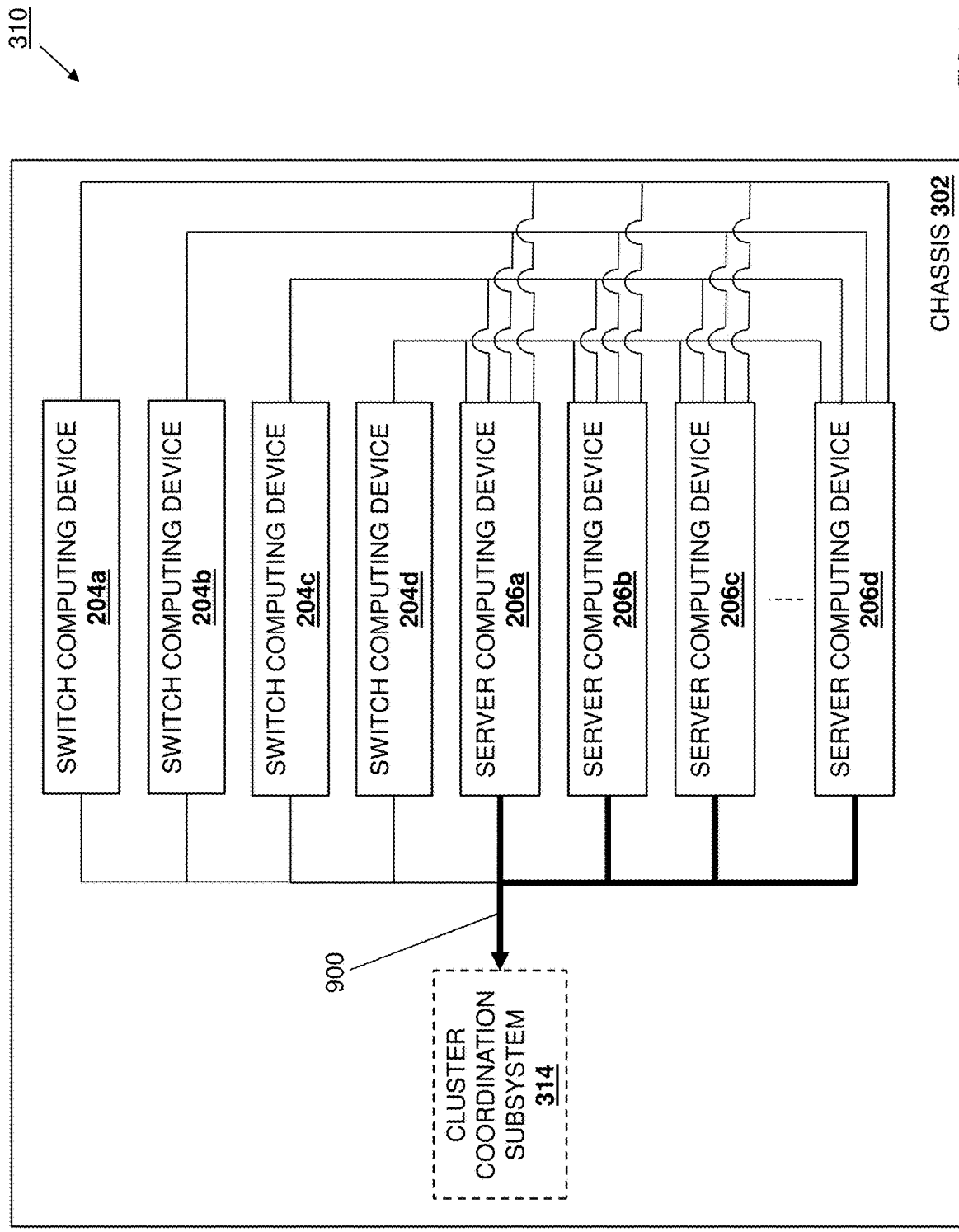

CLUSER-AWARE NETWORKING FABRIC UPDATE SYSTEM

BACKGROUND

The present disclosure relates generally to information handling systems, and more particularly to updating of information handling systems that provide a networking fabric for a hyper-converged infrastructure system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes utilized to provide hyper-converged infrastructure systems, which one of skill in the art in possession of the present disclosure will recognize is a software-defined Information Technology (IT) infrastructure that virtualizes the elements of conventional hardware-defined systems. For example, server computing device(s), switch computing device(s), and/or storage computing device(s) may be configured in a hyper-converged infrastructure system to provide virtualized computing functionality (e.g., via a hypervisor or other virtualized computing component), software-defined storage, and/or virtualized/software-defined networking. The conventional updating of switch computing devices in hyper-converged infrastructure systems can raise some issues.

For example, each of the devices utilized to provide the hyper-converged infrastructure system will initially (e.g., at "day 0") include validated firmware, driver versions, and/or other configuration information/data. As the vendors and/or other device providers validate new firmware, drivers, and/or other configuration information/data for corresponding devices, customers utilizing the hyper-converged infrastructure system may choose to update the devices in their hyper-converged infrastructure system (e.g., as part of the "life-cycle" management of the hyper-converged infrastructure system). Conventional server computing device update systems provide for the automated updating of server computing devices in a manner that attempts to prevent the interruption of the workload being provided using those server computing devices by, for example, selecting a subset of the server computing devices, removing those server computing devices from the hyper-converged infrastructure system (i.e., while the server computing devices remaining in the hyper-converged infrastructure system continue to perform the workload), performing the update on that subset of server computing devices, adding that subset of server computing devices back to the hyper-converged infrastructure system, and then performing the same process for other subsets of the server computing devices until all of the server computing devices in the hyper-converged infrastructure system have been updated.

However, conventional switch computing device update systems require manual operations by the customer or other network administrator, and are not "cluster-aware" in that they do not consider the workload being provided by the server computing devices when updating the switch computing devices in a hyper-converged infrastructure system. Furthermore, given the speed of network transmissions by some server computing devices (e.g., server computing devices utilizing Non-Volatile Memory express (NVMe) storage devices), the networking fabric provided by the switch computing devices can produce a "bottleneck" with regard to the operation of the hyper-converged infrastructure system, and thus removing even a single switch computing device can reduce the throughput of the workload being provided by the server computing devices. As such, the manual operations by the customer or other network administrator in updating the switch computing devices in the hyper-converged infrastructure system (e.g., by removing a switch computing device from the hyper-converged infrastructure system, updating that switch computing device, adding that switch computing device back to the hyper-converged infrastructure system, and repeating that process for each of the switch computing devices in the hyper-converged infrastructure system) is a time consuming process that often results in negative effects on the workload being performed by the server computing devices in the hyper-converged infrastructure system.

Accordingly, it would be desirable to provide a networking fabric update system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a networking fabric update engine that is configured to: identify a networking topology provided by connections between a plurality of server computing devices and a plurality of switch computing devices; forecast workload operations for the plurality of server computing devices; update, based on the networking topology and the workload operations forecast for the plurality of server computing devices, a first subset of the plurality of switch computing devices; and update, following the updating of the first subset of the plurality of switch computing devices, a second subset of the plurality of switch computing devices.

BRIEF DESCRIPTION OF THE DRAWINGS

FIG. 9 is a schematic view illustrating an embodiment of the networking fabric update system of FIGS. 2 and 3B operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
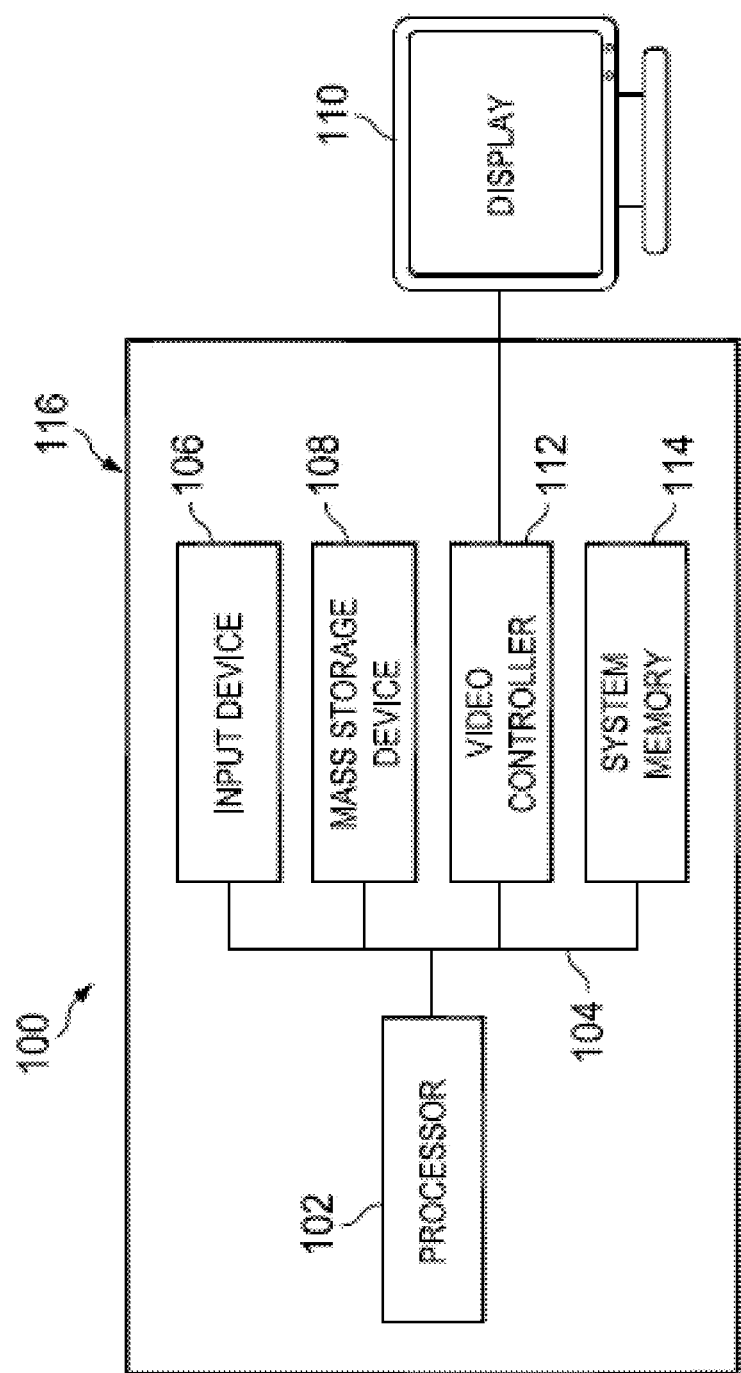
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
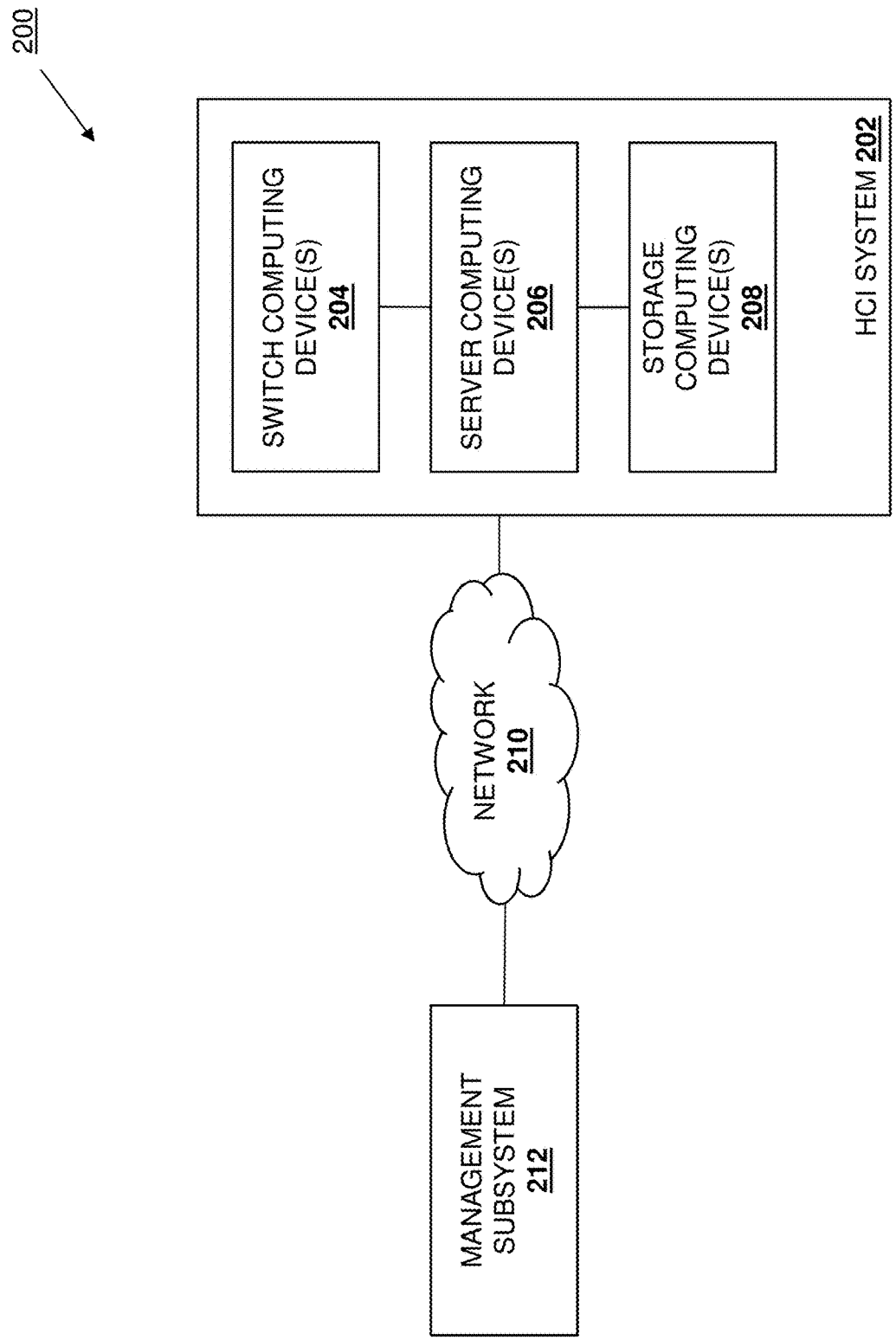
FIG. 2 is a schematic view illustrating an embodiment of a networking fabric update system.

Referring now to FIG. 2, an embodiment of a networking fabric update system 200 is illustrated. In the illustrated embodiment, the networking fabric update system 200 includes a hyper-converged infrastructure system 202 that includes one or more switch computing devices 204, one or more server computing devices 206, and one or more storage computing devices 208, each of which are coupled together and configured to operate to provide hyper-converged infrastructure functionality that virtualizes the elements of conventional hardware-defined systems via the provisioning of virtualized computing functionality (e.g., via a hypervisor or other virtualized computing component), software-defined storage, and/or virtualized/software-defined networking. However, while illustrated and described as being utilized with a hyper-converged infrastructure system, one of skill in the art in possession of the present disclosure will appreciate that the networking fabric update system of the present disclosure may be utilized with a variety of clustered systems while remaining within the scope of the present disclosure as well.

In an embodiment, any or all of the switch computing devices 204, server computing devices 206, and/or storage computing devices 208 may be provided by the IHS 100 discussed above with reference to FIG. 1, and/or may include some or all of the components of the IHS 100. In a specific example, the switch computing device(s) 204 may be provided by Top Of Rack (TOR) switch device(s) in a rack, with the server computing device(s) 206 and the storage computing device(s) 208 provided by server device(s) and storage device(s) that are included in that rack and coupled to the TOR switch device(s). However, while illustrated and discussed as being provided by TOR switch device(s), server device(s), and storage device(s), one of skill in the art in possession of the present disclosure will recognize that computing devices provided in the networking fabric update system 200 may include any devices that may be configured to operate similarly as discussed below. Furthermore, in some embodiments, any of the switch computing device(s) 204, server computing device(s) 206, and/or storage computing device(s) 208 may be omitted from the hyper-converged infrastructure system 202 while remaining within the scope of the present disclosure as well.

In the illustrated embodiment, the hyper-converged infrastructure system 202 is coupled to a network 210 that may be provided by a Local Area Network (LAN), the Internet, combinations thereof, and/or any other network that would be apparent to one of skill in the art in possession of the present disclosure. Furthermore, the illustrated embodiment includes a management subsystem 212 that is also coupled to the network 210. In an embodiment, the management subsystem 212 may be provided by the IHS 100 discussed above with reference to FIG. 1, and/or may include some or all of the components of the IHS 100, and in the specific examples discussed below may be provided by one or more server devices that are configured to perform the management subsystem functionality described below. However, while illustrated and discussed as being provided by server device(s) connected to the hyper-converged infrastructure system 202 via a network 210, one of skill in the art in possession of the present disclosure will recognize that management subsystem provided in the networking fabric update system 200 may include any devices that may be configured to operate similarly as the management subsystem 212 discussed below.

For example, in some embodiments, the management subsystem functionality described below may be performed by management controller device(s) in the switch computing device(s) 204, server computing device(s) 206, and/or storage computing device(s) 208 (e.g., an integrated DELL® Remote Access Controller (iDRAC) device available in server devices provided by DELL® Inc. of Round Rock, Tex., United States, a Baseboard Management Controller (BMC) device, and/or other management controller devices known in the art) while remaining within the scope of the present disclosure as well. Thus, while a specific networking fabric update system 200 has been illustrated and described, one of skill in the art in possession of the present disclosure will recognize that the networking fabric update system of the present disclosure may include a variety of components and component configurations while remaining within the scope of the present disclosure as well.

Figure 3A:
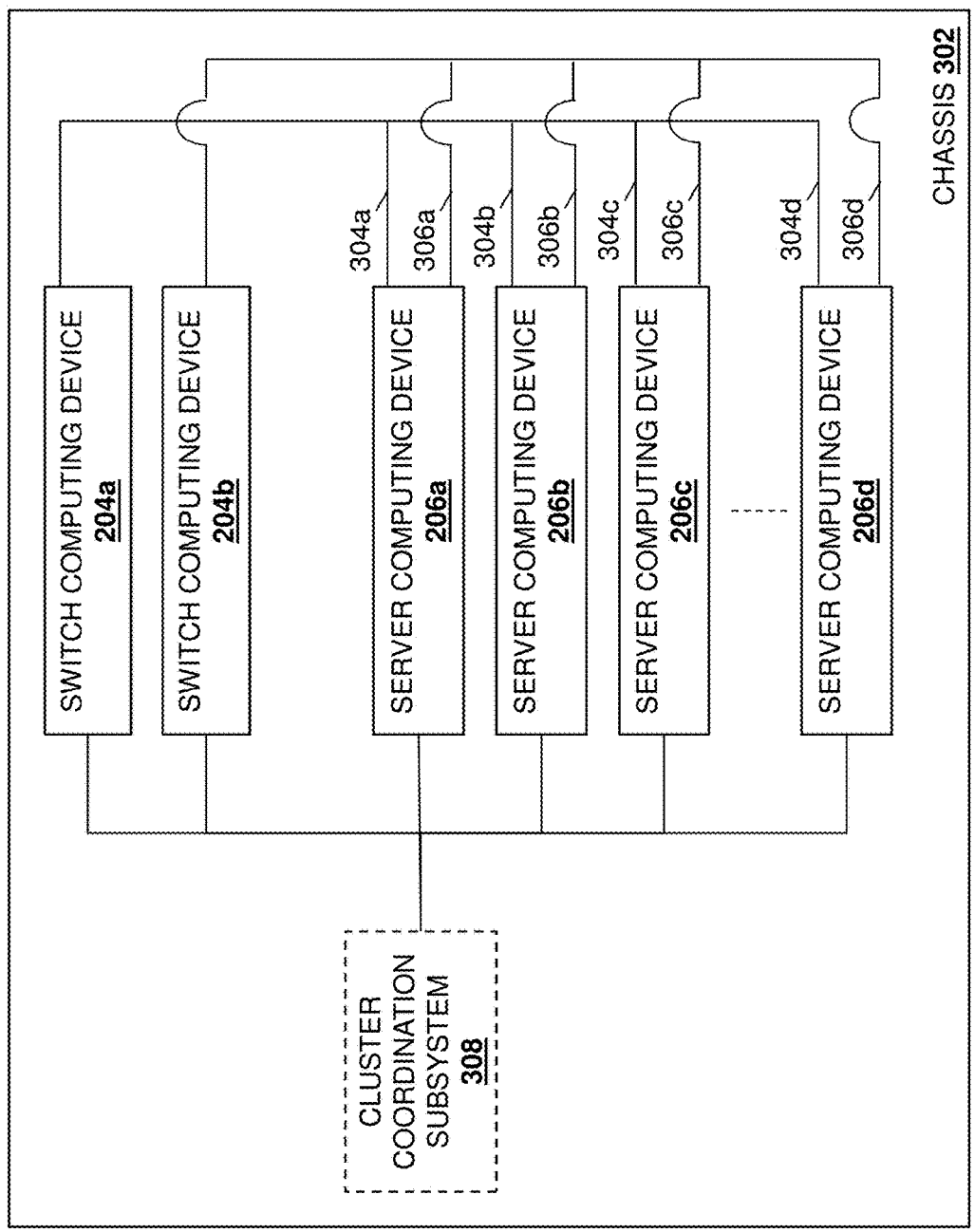
FIG. 3A is a schematic view illustrating an embodiment of a physical networking configuration that may be provided in the networking fabric update system of FIG. 2.

Referring now to FIG. 3A, an embodiment of a computing device configuration 300 is illustrated that includes a chassis 302 that may be provided by a rack and/or other chassis known in the art. In the illustrated embodiment, the chassis 302 houses a pair of the switch computing devices 204 discussed above with reference to FIG. 2, which are identified as switch computing devices 204a and 204b in FIG. 3A. The chassis 302 also houses a plurality of the server computing device 206 discussed above with reference to FIG. 2, which are identified as server computing devices 206a, 206b, 206c, and up to 206d in FIG. 3A. As illustrated, the switch computing device 204a is coupled via one or more links 304a to the server computing device 206a, one or more links 304b to the server computing device 206b, one or more links 304c to the server computing device 206c, and one or more links 304d to the server computing device 206d. Similarly, the switch computing device 204b is coupled via one or more links 306a to the server computing device 206a, one or more links 306b to the server computing device 206b, one or more links 306c to the server computing device 206c, and one or more links 306d to the server computing device 206d.

As discussed below, in some embodiments, the computing device configuration 300 may provide a "fully converged" networking configuration that includes a respective link provided between the switch computing device 204a and each of the server computing devices 206a-206d, a respective link provided between the switch computing device 204b and each of the server computing devices 206a-206d, and with each of the switch computing devices 204a and 204b configured to exchange both management traffic and storage traffic (e.g., via a respective management network and storage network) via its respective link with each server computing device 206a-206d. However, as also discussed below, in some embodiments the computing device configuration 300 may provide a "non-converged" networking configuration that includes respective first and second links provided between the switch computing device 204a and each of the server computing devices 206a-206d, respective first and second links provided between the switch computing device 204b and each of the server computing devices 206a-206d, and with each of the switch computing devices 204a and 204b configured to exchange management traffic (e.g., via a respective management network) via its respective first link to each server computing device 206a-206d, and configured to exchange storage traffic (e.g., via a respective storage network) via its respective second link to each server computing device 206a-206d.

In the illustrated embodiment, a cluster coordination subsystem 308 is coupled to each of the switch computing devices 204a and 204b, as well as each of the server computing devices 206a-206d. In some embodiments, the cluster coordination subsystem 308 may be provided by one of the server computing devices 206a-206d. For example, the cluster coordination subsystem functionality discussed below may be performed by a management controller device in one of the switch computing devices 206a and 206b (e.g., using an iDRAC® device, BMC device, and/or other management controller devices known in the art) while remaining within the scope of the present disclosure as well. However, while discussed as being provided by one of the server computing devices 206a-206d, one of skill in the art in possession of the present disclosure will appreciate that the functionality of the cluster coordination subsystem may be provided by other devices and/or system while remaining within the scope of the present disclosure as well. Furthermore, while a particular computing device configuration 300 is illustrated and described, one of skill in the art in possession of the present disclosure will appreciate that other computing device configurations will fall within the scope of the present disclosure as well.

Figure 3B:
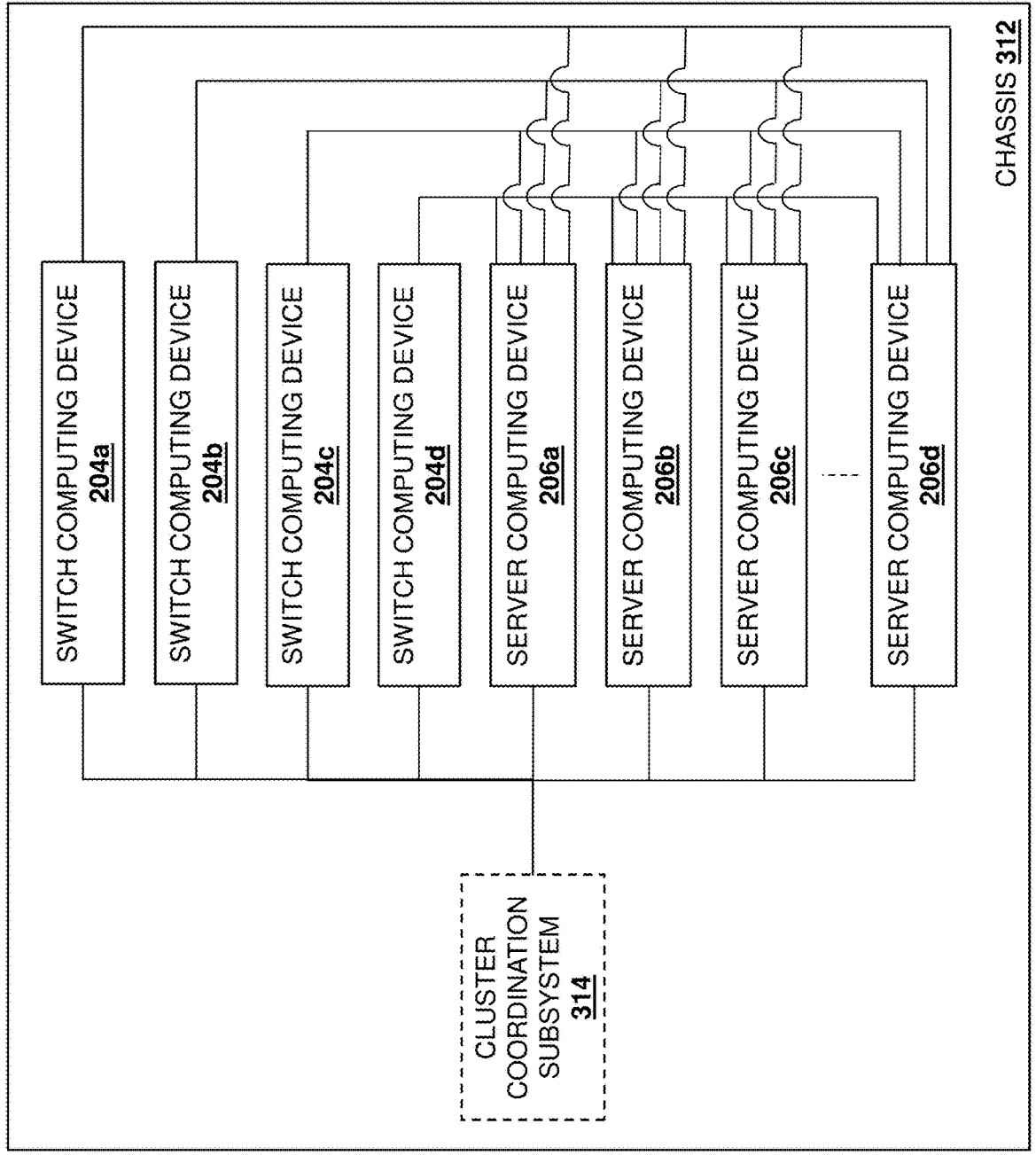
FIG. 3B is a schematic view illustrating an embodiment of a physical networking configuration that may be provided in the networking fabric update system of FIG. 2.

For example, with reference to FIG. 3B, an embodiment of a computing device configuration 310 is illustrated that includes a chassis 312 that may be provided by a rack and/or other chassis known in the art. In the illustrated embodiment, the chassis 312 houses four of the switch computing devices 204 discussed above with reference to FIG. 2, which are identified as switch computing devices 204a, 204b, 204c, and 204d in FIG. 3B. The chassis 312 also houses a plurality of the server computing device 206 discussed above with reference to FIG. 2, which are identified as server computing devices 206a, 206b, 206c, and up to 206d in FIG. 3B. As illustrated, the switch computing device 204a is coupled via one or more links 304a to each of the server computing devices 206a-206d, and the switch computing device 204b is coupled via one or more links to each of the server computing devices 206a-206d.

As discussed below, in some embodiments, the computing device configuration 310 may provide a "non-converged" networking configuration that includes a respective link provided between the switch computing device 204a and each of the server computing devices 206a-206d, a respective link provided between the switch computing device 204*b* and each of the server computing devices 206*a*-206*d*, a respective link provided between the switch computing device 204*c* and each of the server computing devices 206*a*-206*d*, a respective link provided between the switch computing device 204*d* and each of the server computing devices 206*a*-206*d*, with each of the switch computing devices 204*a* and 204*b* configured to exchange storage traffic (e.g., via a respective storage network) via its respective first link to each server computing device 206*a*-206*d*, and each of the switch computing devices 204*c* and 204*d* configured to exchange management traffic (e.g., via a respective management network) via its respective link to each server computing device 206*a*-206*d*. However, while particular computing device configurations 300 and 310 are illustrated and described, one of skill in the art in possession of the present disclosure will appreciate that other computing device configurations will fall within the scope of the present disclosure as well.

In the illustrated embodiment, a cluster coordination subsystem 314 is coupled to each of the switch computing devices 204*a*-204*d*, as well as each of the server computing devices 206*a*-206*d*. In some embodiments, the cluster coordination subsystem 314 may be provided by one of the server computing devices 206*a*-206*d*. For example, the cluster coordination subsystem functionality discussed below may be performed by a management controller device in one of the switch computing devices 206*a*-206*d* (e.g., using an iDRAC® device, BMC device, and/or other management controller devices known in the art) while remaining within the scope of the present disclosure as well. However, while discussed as being provided by one of the server computing devices 206*a*-206*d*, one of skill in the art in possession of the present disclosure will appreciate that the functionality of the cluster coordination subsystem may be provided by other devices and/or system while remaining within the scope of the present disclosure as well. Furthermore, particular computing device configurations 300 and 310 are illustrated and described, one of skill in the art in possession of the present disclosure will appreciate that other computing device configurations will fall within the scope of the present disclosure as well.

Figure 4:
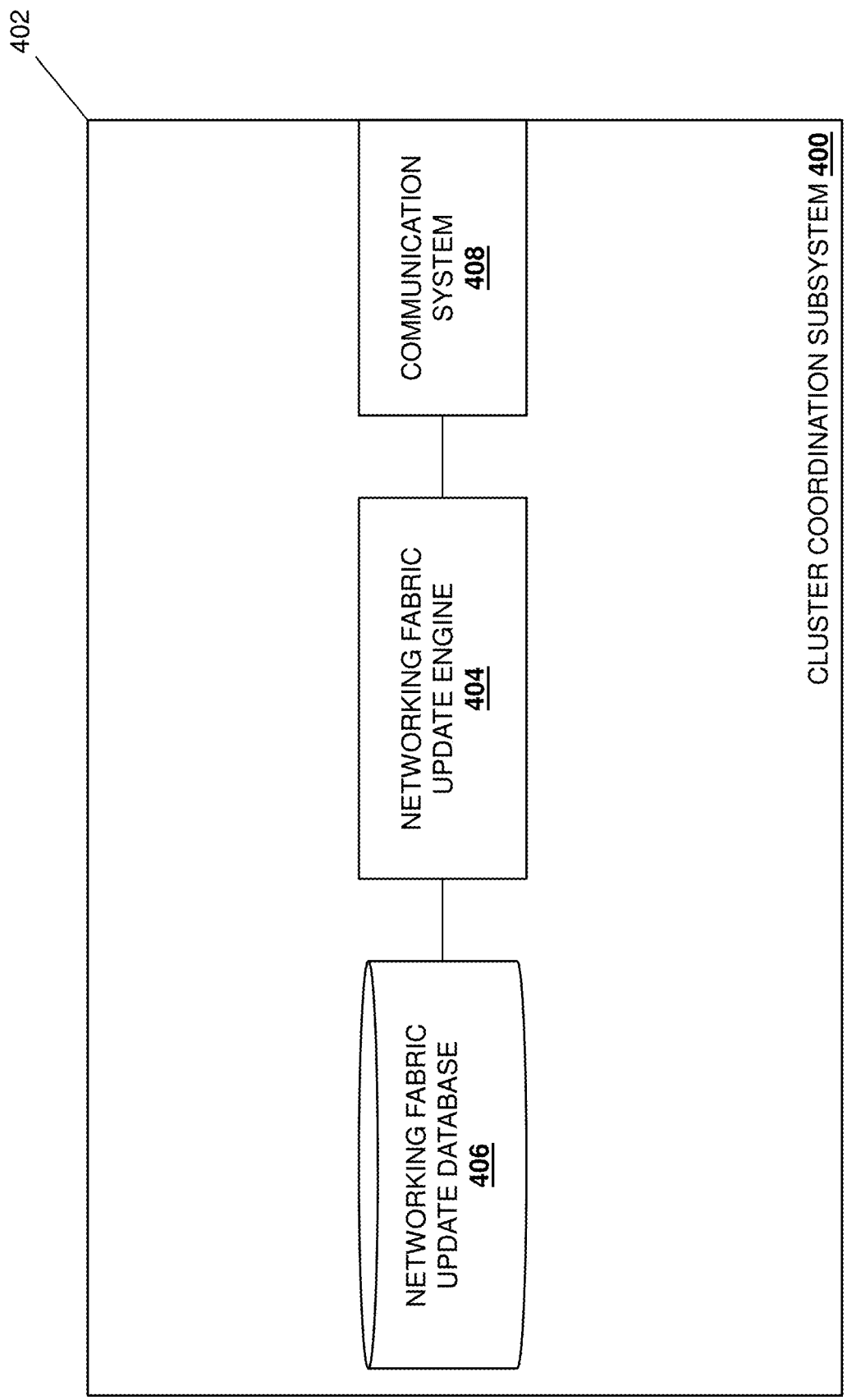
FIG. 4 is a schematic view illustrating an embodiment of a cluster coordination system that may be provided in the networking fabric update system of FIG. 2.

Referring now to FIG. 4, an embodiment of a cluster coordination subsystem 400 is illustrated that may provide the cluster coordination subsystems 308 or 314 discussed above with reference to FIG. 3A or 3B. As such, the cluster coordination subsystem 400 may be provided by the IHS 100 discussed above with reference to FIG. 1 and/or may include some or all of the components of the IHS 100, and in specific examples may be provided in one of the server computing devices 206*a*-206*d*. However, while illustrated and discussed as being provided by specific devices in many of the examples below, one of skill in the art in possession of the present disclosure will recognize that the functionality of the cluster coordination subsystem 400 discussed below may be provided by other devices that are configured to operate similarly as the cluster coordination subsystem 400 discussed below. In the illustrated embodiment, the cluster coordination subsystem 400 includes a chassis 402 that houses the components of the cluster coordination subsystem 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a networking fabric update engine 404 that is configured to perform the functionality of the networking fabric update engines and/or cluster coordination subsystem discussed below.

The chassis 402 may also house a storage system (not illustrated, but which may include the storage 108 discussed above with reference to FIG. 1) that is coupled to the networking fabric update engine 404 (e.g., via a coupling between the storage system and the processing system) and that includes a networking fabric update database 406 that is configured to store any of the information utilized by the networking fabric update engine 404 discussed below. The chassis 402 may also house a communication system 408 that is coupled to the networking fabric update engine 404 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific cluster coordination subsystem 400 has been illustrated, one of skill in the art in possession of the present disclosure will recognize that cluster coordination subsystems (or other devices operating according to the teachings of the present disclosure in a manner similar to that described below for the cluster coordination subsystem 400) may include a variety of components and/or component configurations for providing conventional cluster coordination subsystem functionality, as well as the functionality discussed below, while remaining within the scope of the present disclosure as well.

Figure 5:
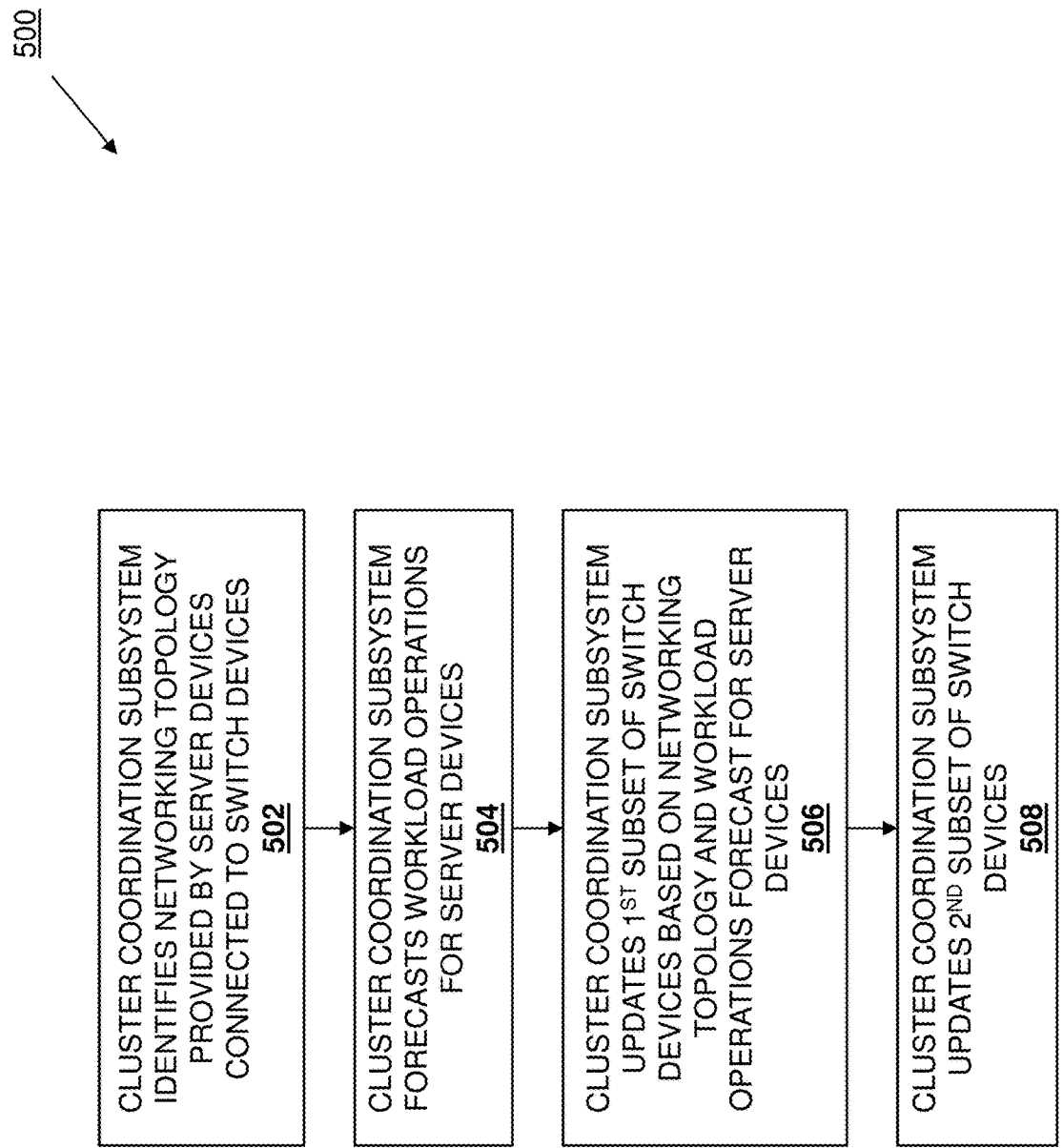
FIG. 5 is a flow chart illustrating an embodiment of a method for updating a networking fabric.

Referring now to FIG. 5, an embodiment of a method 500 for updating a networking fabric is illustrated. As discussed below, the systems and methods of the present disclosure provide a "cluster-aware" technique for updating a networking fabric that is agnostic of the target switch computing devices that provide the networking fabric. For example, the networking fabric update system of the present disclosure includes a cluster coordination subsystem coupled to server computing devices and switch computing devices. The cluster coordination subsystem identifies a networking topology provided by connections between the server computing devices and switch computing devices, and forecasts workload operations for the server computing devices. Based on the networking topology and the workload operations forecast for the server computing devices, the cluster coordination subsystem updates a first subset of the switch computing devices and, following the updating of the first subset of the switch computing devices, updates a second subset of the switch computing devices. The updating of the first subset of the switch computing devices may include determining that current workload operations for the server computing devices during a current time period are above a workload threshold for the first subset of the switch computing devices, and scheduling and updating the first subset of the switch computing devices during a subsequent time period. As will be appreciated by one of skill in the art in possession of the present disclosure, the networking fabric update system of the present disclosure eliminates conventionally required manual operations to update the networking fabric, and prevents the negative effects on the workload being performed by the server computing devices that occurs with conventional networking fabric update systems.

In some embodiments, the computing devices in the hyper-converged infrastructure system 202, the cluster coordination subsystem 308/314, and in some embodiments, the management subsystem 212, may be part of a "trust domain" built and/or otherwise provided for the hyper-converged infrastructure system 202 using techniques described by the inventors of the present disclosure in U.S. patent application Ser. No. 17/019,523, filed on Sep. 14, 2020, the disclosure of which is incorporated herein by reference. As such, as described in that patent application, any or all of the computing devices in the hyper-converged infrastructure system 202, the cluster coordination subsystem 308/314, and in some embodiments, the management subsystem 212, may be configured to utilize authentication information and a computing device component hash value to have their communications validated by computing devices in the hyper-converged infrastructure system 202 in order to confirm that they are part of the trust domain for the hyper-converged infrastructure system 202, which allows the computing devices in the hyper-converged infrastructure system 202 to share information with each other (and in some embodiment with the management subsystem 212) in a secure manner and without the need for credentials or certificates that are required to secure communications in conventional hyper-converged infrastructure systems. Thus, in some embodiments, the communications exchanged between the computing devices in the hyper-converged infrastructure system 202 (and in some embodiments, with the management subsystem 212) as discussed below may be performed as part of a trust domain.

The method 500 begins at block 502 where a cluster coordination subsystem identifies a networking topology provided by server devices connected to switch devices. In an embodiment, at block 502, the cluster coordination subsystem may operate to identify a networking topology provided by the server computing devices 206 connected to the switch computing devices 204 in the hyper-converged infrastructure system 202 using techniques by the inventors of the present disclosure in U.S. patent application Ser. No. 17/019,555, filed on Sep. 14, 2020, the disclosure of which is incorporated herein in its entirety. As such, as described in that patent application, the cluster coordination subsystem may determine that the server computing devices 206 are connected to switch ports, identify the switch computing devices 204 that include those switch ports, retrieve switch port configuration information for those switch ports from those switch computing devices 204, and determine a networking topology based on the connections of the switch computing devices 204 to the server computing devices 206 and, in some examples, the switch port configurations information for those switch ports. As will be appreciated by one of skill in the art in possession of the present disclosure, the cluster coordination subsystem is part of the cluster and has knowledge of all of the server computing devices 206 in the trust domain, and the cluster coordination subsystem to retrieve management address details (e.g., management IP address details) and credentials for the switch computing devices 204 using trust domain operations as well.

Figure 6A:
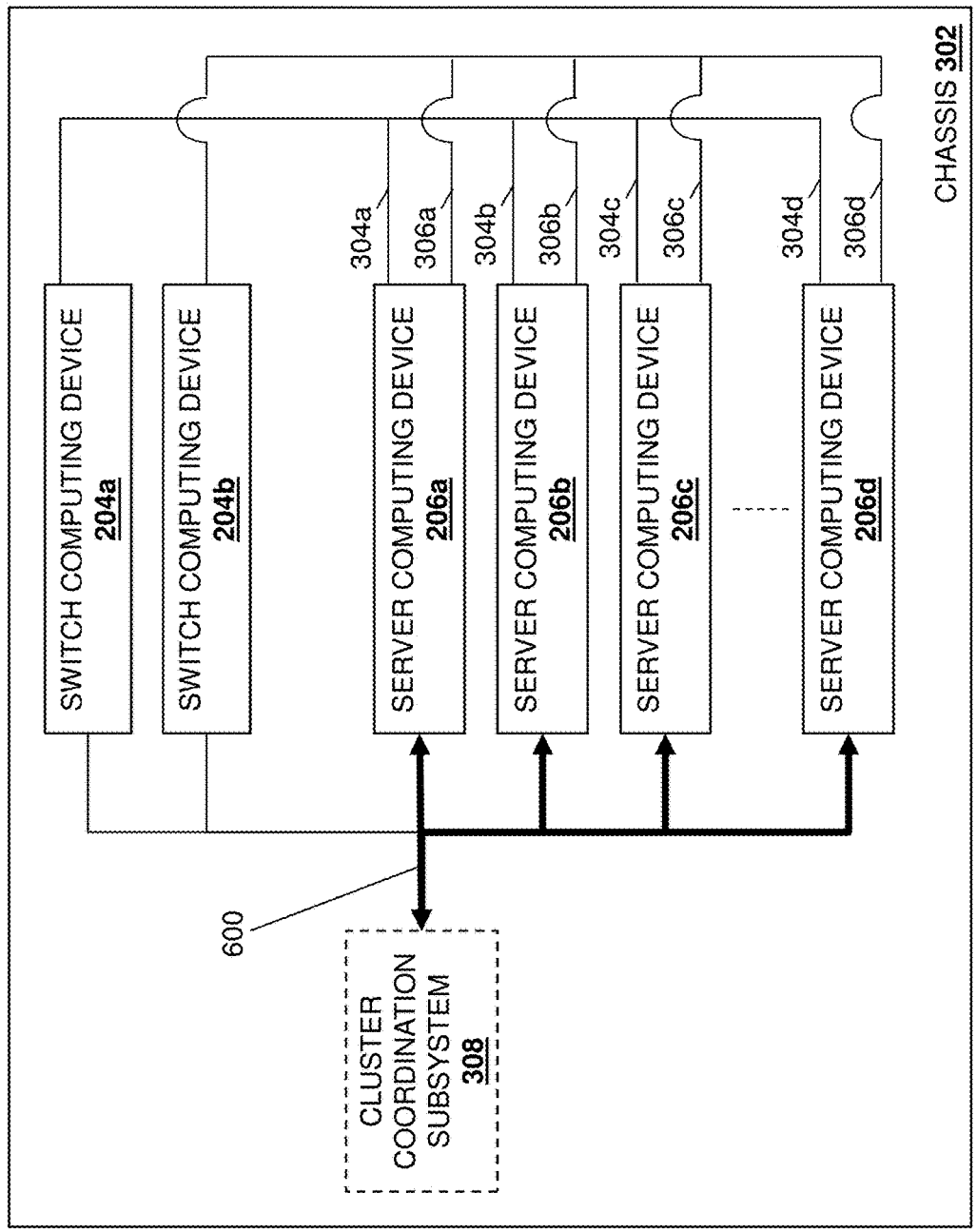
FIG. 6A is a schematic view illustrating an embodiment of the networking fabric update system of FIGS. 2 and 3A operating during the method of FIG. 5.
Figure 6B:
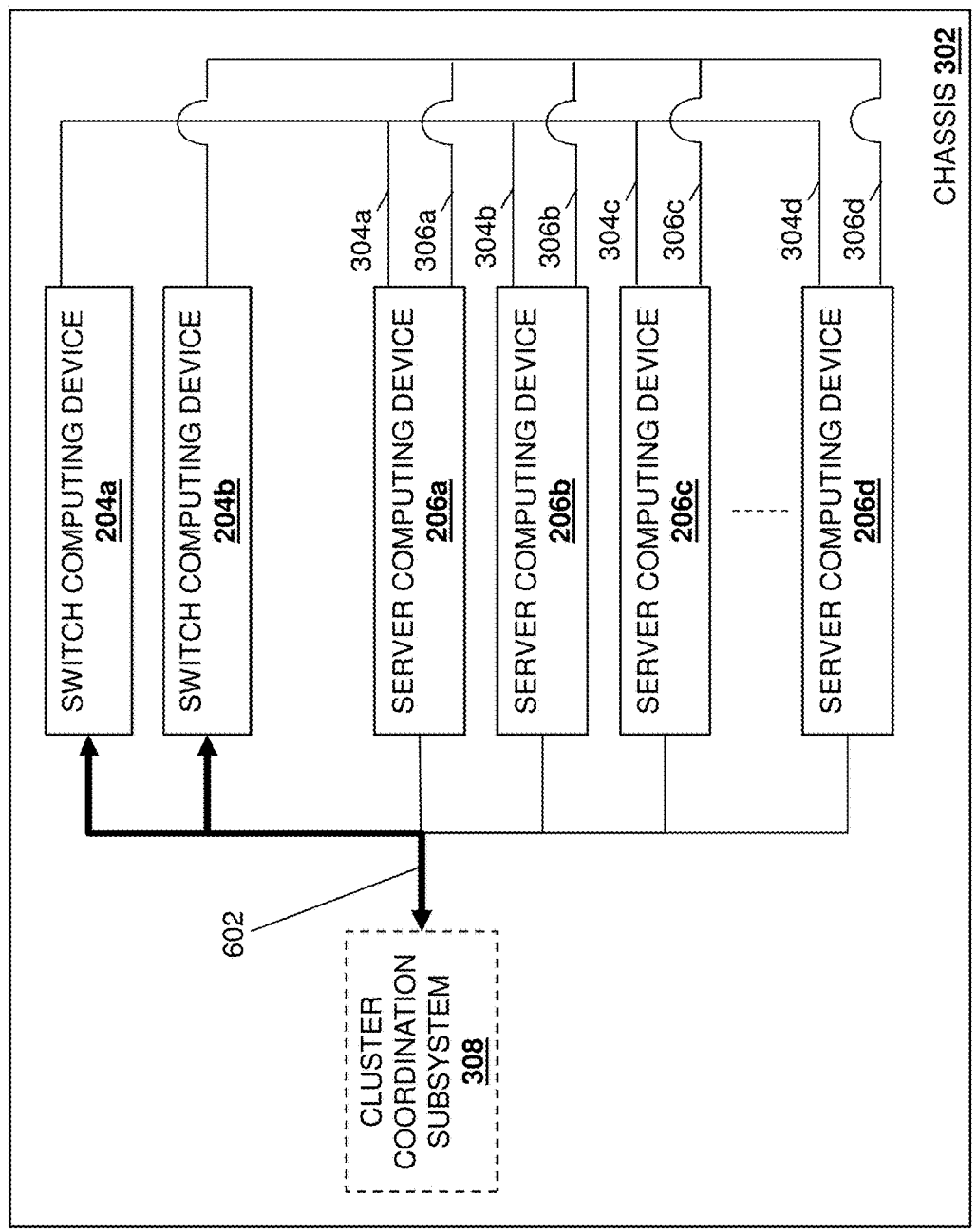
FIG. 6B is a schematic view illustrating an embodiment of the networking fabric update system of FIGS. 2 and 3A operating during the method of FIG. 5.

For example, with reference to FIGS. 6A and 6B and the computing device configuration 300 discussed above with reference to FIG. 3A, the cluster coordination subsystem 308 may perform server computing device communication operations 600 (e.g., utilizing the trust domain discussed above) in order to determine that the server computing devices 206a-206d are connected to switch ports, followed by the performance of switch computing device communication operations 602 (e.g., utilizing the trust domain discussed above) in order to identify the switch computing devices 204a and 204b that include those switch ports and retrieve switch port configuration information for those switch ports from those switch computing device 204a and 204b, and then may determine a networking topology based on the switch port connections of the switch computing devices 204a and 204b to the server computing devices 206a-206d and, in some examples, the switch port configurations information for those switch ports.

As discussed above, the networking topology determined in the example illustrated in FIGS. 3A, 6A, and 6B may be a "fully-converged" networking topology that includes a respective link provided between the switch computing device 204a and each of the server computing devices 206a-206d, a respective link provided between the switch computing device 204b and each of the server computing devices 206a-206d, and with each of the switch computing devices 204a and 204b configured to exchange both management traffic and storage traffic (e.g., via a respective management network and storage network) via its respective link with each server computing device 206a-206d. However, as also discussed above, the networking topology determined in the example illustrated in FIGS. 3A, 6A, and 6B may be a "non-converged" networking configuration that includes respective first and second links provided between the switch computing device 204a and each of the server computing devices 206a-206d, respective first and second links provided between the switch computing device 204b and each of the server computing devices 206a-206d, and with each of the switch computing devices 204a and 204b configured to exchange management traffic (e.g., via a respective management network) via its respective first link to each server computing device 206a-206d, and configured to exchange storage traffic (e.g., via a respective storage network) via its respective second link to each server computing device 206a-206d.

Figure 7A:
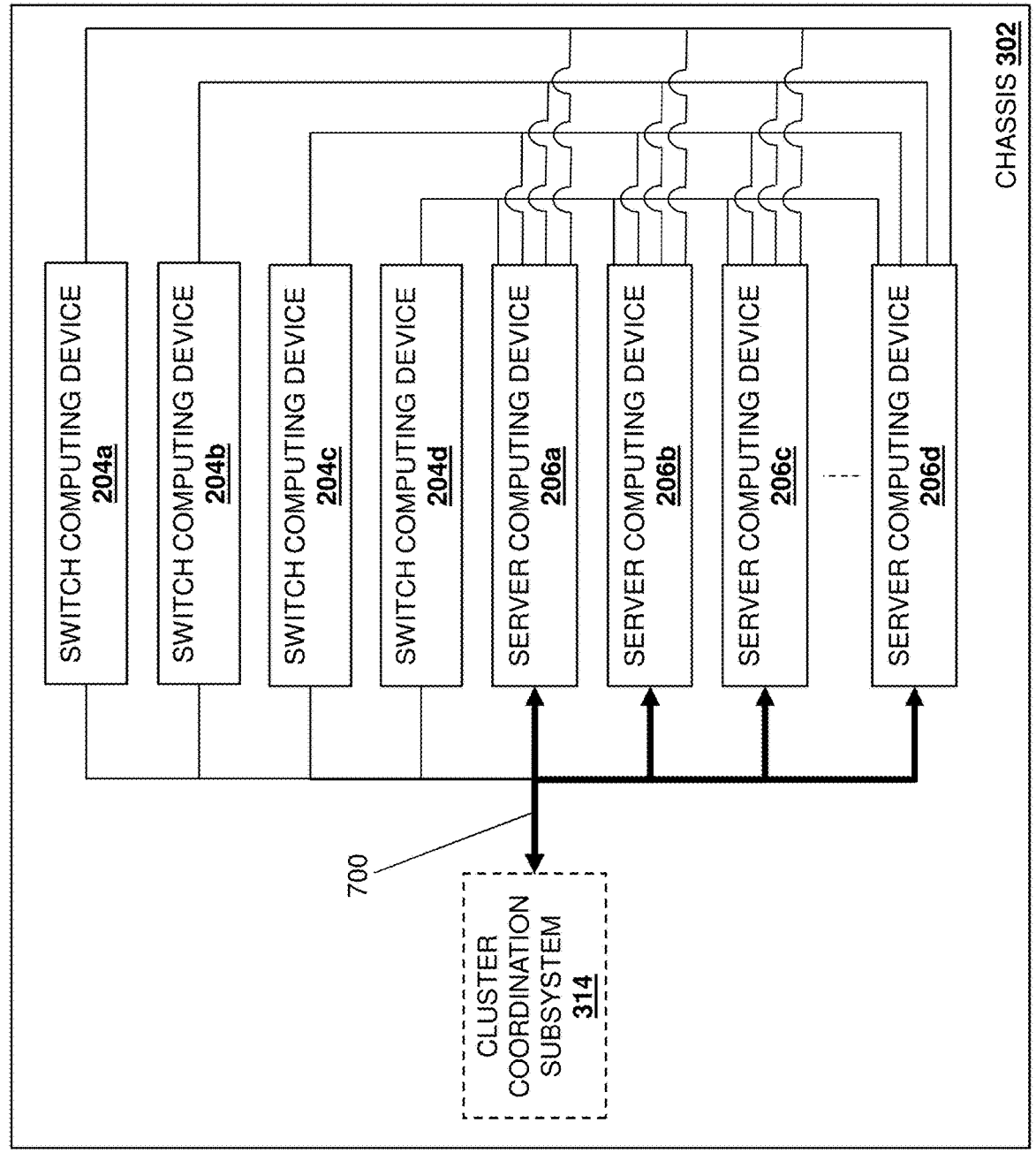
FIG. 7A is a schematic view illustrating an embodiment of the networking fabric update system of FIGS. 2 and 3B operating during the method of FIG. 5.
Figure 7B:
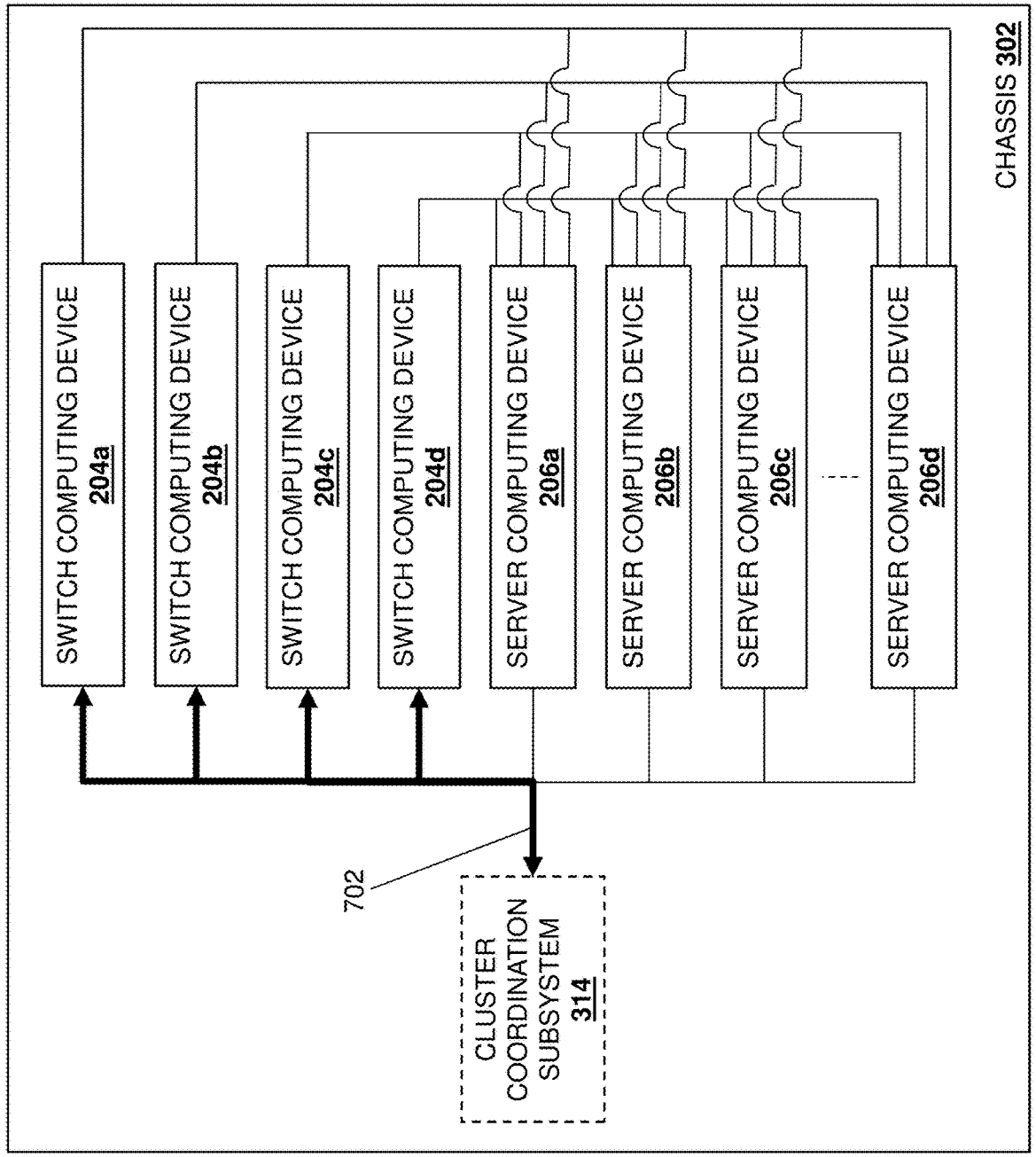
FIG. 7B is a schematic view illustrating an embodiment of the networking fabric update system of FIGS. 2 and 3B operating during the method of FIG. 5.

In another example, with reference to FIGS. 7A and 7B and the computing device configuration 310 discussed above with reference to FIG. 3B, the cluster coordination subsystem 314 may perform server computing device communication operations 700 (e.g., as part of the trust domain discussed above) in order to determine that the server computing devices 206a-206d are connected to switch ports, followed by the performance of switch computing device communication operations 702 (e.g., as part of the trust domain discussed above) in order to identify the switch computing devices 204a-204d that include those switch ports and retrieve switch port configuration information for those switch ports from those switch computing device 204a-204d, and then may determine a networking topology based on the switch port connections of the switch computing devices 204a-204d to the server computing devices 206a-206d and, in some examples, the switch port configurations information for those switch ports.

As discussed above, the networking topology determined in the example illustrated in FIGS. 3B, 7A, and 7B may be a "non-converged" networking configuration that includes a respective link provided between the switch computing device 204a and each of the server computing devices 206a-206d, a respective link provided between the switch computing device 204b and each of the server computing devices 206a-206d, a respective link provided between the switch computing device 204c and each of the server computing devices 206a-206d, a respective link provided between the switch computing device 204d and each of the server computing devices 206a-206d, with each of the switch computing devices 204a and 204b configured to exchange storage traffic (e.g., via a respective storage network) via its respective link to each server computing device 206a-206d, and each of the switch computing devices 204c and 204*d* configured to exchange management traffic (e.g., via a respective management network) via its respective link to each server computing device 206*a*-206*d*.

The method 500 then proceeds to block 504 where the cluster coordination subsystem forecasts workload operations for the server devices. In an embodiment, at block 504, the cluster coordination subsystem may operate to monitor workload operations being performed by the server computing devices 206. For example, at block 504, the cluster coordination subsystem may monitor the Network Interface Controller (NIC) device(s) in each server computing device 206 in order to determine networking traffic being sent and received by the server computing devices 206, which one of skill in the art in possession of the present disclosure will recognize is handled by the switch computing devices 204 connected to those server computing devices 206 and is indicative of the workload operations being performed by those server computing devices 206 (i.e., because those workload operations require the sending and receiving of networking traffic via the connected switch computing devices 204). However, while a particular technique for monitoring workload operations performed by server computing devices via the monitoring of networking traffic exchanged by those server computing devices, one of skill in the art in possession of the present disclosure will appreciate that cluster coordination subsystems may include a variety of access to performance histories of their corresponding cluster system, and thus workload operations performed by server computing devices may be monitored in other manners that will fall within the scope of the present disclosure as well.

Figure 8:
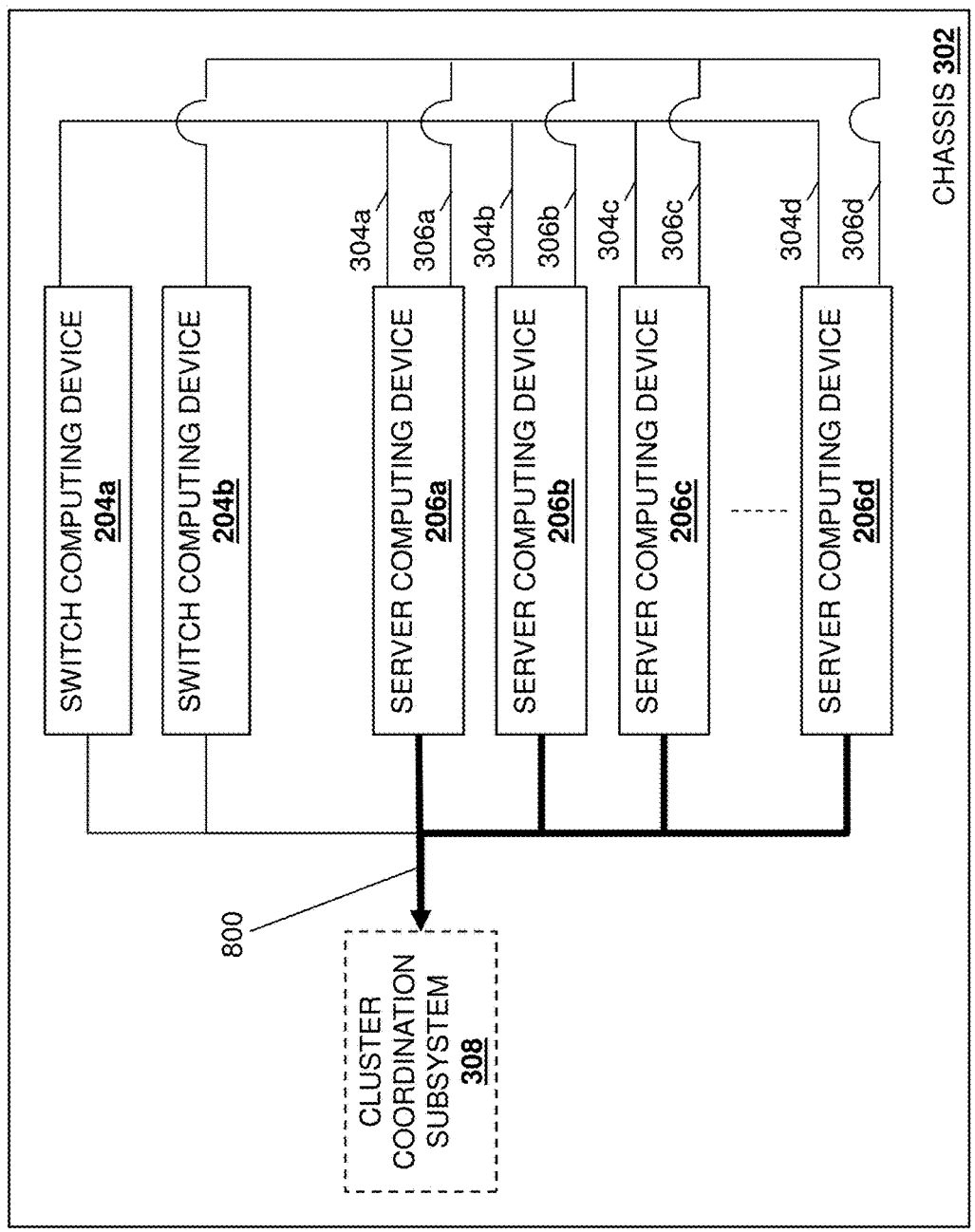
FIG. 8 is a schematic view illustrating an embodiment of the networking fabric update system of FIGS. 2 and 3A operating during the method of FIG. 5.

For example, with reference to FIG. 8 and the computing device configuration 300 discussed above with reference to FIG. 3A, the cluster coordination subsystem 308 may perform workload monitoring operations 800 that include, for example, the monitoring of networking traffic exchanged with the switch computing devices 204*a* and 204*b* via the NIC devices in the server computing devices 206*a*-206*d* as discussed above, and/or using other workload monitoring operations that would be apparent to one of skill in the art in possession of the present disclosure. In an embodiment, the workload monitoring operations 800 may be performed periodically by the cluster coordination subsystem 308, with any workload operation data that is retrieved via the workload monitoring operations 800 then stored as the "historical" workload operations for the server computing devices 206*a*-206*d* in the networking fabric update database 406 (which provides a historical workload operations database in this example). Thus, on any particular performance of block 504, "current" workload operations for the server computing devices 206*a*-206*d* may be identified via the workload monitoring operations 800, while previously stored "historical" workload operations may be included in the networking fabric update database 406, and those "current" workload operations may be stored in the networking fabric update database 406 such that they become "historical" workload operations on a subsequent performance of block 504.

In another example, with reference to FIG. 9 and the computing device configuration 310 discussed above with reference to FIG. 3B, the cluster coordination subsystem 314 may perform workload monitoring operations 900 that include, for example, the monitoring of networking traffic exchanged with the switch computing devices 204*a*-204*d* via the NIC devices in the server computing devices 206*a*-206*d* as discussed above, and/or using other workload monitoring operations that would be apparent to one of skill in the art in possession of the present disclosure. In an embodiment, the workload monitoring operations 900 may be performed periodically by the cluster coordination subsystem 314, with any workload operation data that is retrieved via the workload monitoring operations 900 then stored as the "historical" workload operations for the server computing devices 206*a*-206*d* in the networking fabric update database 406 (which provides a historical workload operations database in this example). Thus, on any particular performance of block 504, "current" workload operations for the server computing devices 206*a*-206*d* may be identified via the workload monitoring operations 900, while previously stored "historical" workload operations may be included in the networking fabric update database 406, and those "current" workload operations may be stored in the networking fabric update database 406 such that they become "historical" workload operations on a subsequent performance of block 504.

Thus, in some embodiments of block 504, the cluster coordination subsystem may utilize the "current" workload operations and/or the "historical" workload operations associated with the server computing devices 206 in order to forecast workload operations for the server computing devices 206. As such, with reference to the example of the computing device configuration 300 discussed above with reference to FIG. 3A, the cluster coordination subsystem 308 may forecast workload operations for the server computing devices 206*a*-206*d*, which one of skill in the art in possession of the present disclosure will appreciate may include the forecasting of networking traffic that may be exchanged between the server computing devices 206*a*-206*d* and switch computing devices 204*a* and 204*b* in a "current" time period (e.g., from the present time to a subsequent time in the future), and in one or more "subsequent" time periods that follow the "current" time period. In a specific example, the workload operation forecast for the server computing devices 206*a*-206*d* may utilize the "current" workload operations to forecast the workload operations for the server computing devices 206*a*-206*d* in the "current" time period, may utilize the "historical" workload operations (as well as, in some embodiments, the "current" workload operations) to forecast the workload operations for the server computing devices 206*a*-206*d* in the "subsequent" time period(s), and one of skill in the art in possession of the present disclosure will recognize that a variety of workload operation forecasting techniques may be utilized with the "current" and "historical" workload operations discussed above in order to forecast workload operations while remaining within the scope of the present disclosure.

Similarly, with reference to the example of the computing device configuration 310 discussed above with reference to FIG. 3B, the cluster coordination subsystem 314 may forecast workload operations for the server computing devices 206*a*-206*d*, which one of skill in the art in possession of the present disclosure will appreciate may include the forecasting of networking traffic that may be exchanged between the server computing devices 206*a*-206*d* and switch computing devices 204*a*-204*d* in a "current" time period (e.g., from the present time to a subsequent time in the future), and in one or more "subsequent" time periods that follow the "current" time period. Similarly to the specific example provided above, the workload operation forecast for the server computing devices 206*a*-206*d* may utilize the "current" workload operations to forecast the workload operations for the server computing devices 206*a*-206*d* in the "current" time period, may utilize the "historical" workload operations (as well as, in some embodiments, the "current" workload operations) to forecast the workload operations for the server computing devices 206a-206d in the "subsequent" time period(s), and one of skill in the art in possession of the present disclosure will recognize that a variety of workload operation forecasting techniques may be utilized with the "current" and "historical" workload operations discussed above in order to forecast workload operations while remaining within the scope of the present disclosure.

The method 500 then proceeds to block 506 where the cluster coordination subsystem updates a first subset of the switch devices based on the networking topology and the workload operations forecast for the server devices. In an embodiment, at block 506, the cluster coordination subsystem may operate to update a subset of the switch devices 204 based on the networking topology determined at block 502 and the workload operations forecast at block 504. As discussed above, a switch computing device vendor or other provider may provide updates for the switch computing devices 204, and thus at block 506 the cluster coordination subsystem may perform those updates automatically based on the networking topology provided by the connections between the server computing devices 206 and the switch computing devices 204, and the workload operations forecast for the server computing devices 206. As will be appreciated by one of skill in the art in possession of the present disclosure, in the event of the failure of update operations on any switch computing device 204 at block 506, any update information on that switch computing device may be reverted back, and an update error message displayed to a user or other network administrator.

With reference to the example of the computing device configuration 300 discussed above with reference to FIG. 3A, in some embodiments, the cluster coordination subsystem 308 may have determined that the computing device configuration 300 provides a "fully-converged" networking topology that includes a respective link provided between the switch computing device 204a and each of the server computing devices 206a-206d, a respective link provided between the switch computing device 204b and each of the server computing devices 206a-206d, and with each of the switch computing devices 204a and 204b configured to exchange both management traffic and storage traffic (e.g., via a respective management network and storage network) via its respective link with each server computing device 206a-206d. However, in other embodiments, the cluster coordination subsystem 308 may have determined that the computing device configuration 300 provides a "non-converged" networking configuration that includes respective first and second links provided between the switch computing device 204a and each of the server computing devices 206a-206d, respective first and second links provided between the switch computing device 204b and each of the server computing devices 206a-206d, and with each of the switch computing devices 204a and 204b configured to exchange management traffic (e.g., via a respective management network) via its respective first link to each server computing device 206a-206d, and configured to exchange storage traffic (e.g., via a respective storage network) via its respective second link to each server computing device 206a-206d.

As will be appreciated by one of skill in the art in possession of the present disclosure, either of the "fully-converged" and "non-converged" networking topologies for the computing device configuration 300 provide only one "set" of switch computing devices 204a and 204b to update. As such, the cluster coordination subsystem 308 may use the workload operation forecast for the server computing devices 206a-206d to determine whether one of the switch computing devices 204a and 204b is capable of handling the networking traffic being exchanged by the server computing devices 206a-206d in the "current" time period (e.g., if the workload operation forecast for the server computing devices 206a-206d in the "current" time period is below a workload threshold for that switch computing device). If one of the switch computing devices 204a and 204b is not capable of handling the networking traffic being exchanged by the server computing devices 206a-206d in the "current" time period, the cluster coordination subsystem 308 may determine a "subsequent" time period in which one of the switch computing devices 204a and 204b will be capable of handling the networking traffic being exchanged by the server computing devices 206a-206d (e.g., a "subsequent" time period in which the workload operation forecast for the server computing devices 206a-206d is below a workload threshold for that switch computing device).

Figure 10A:
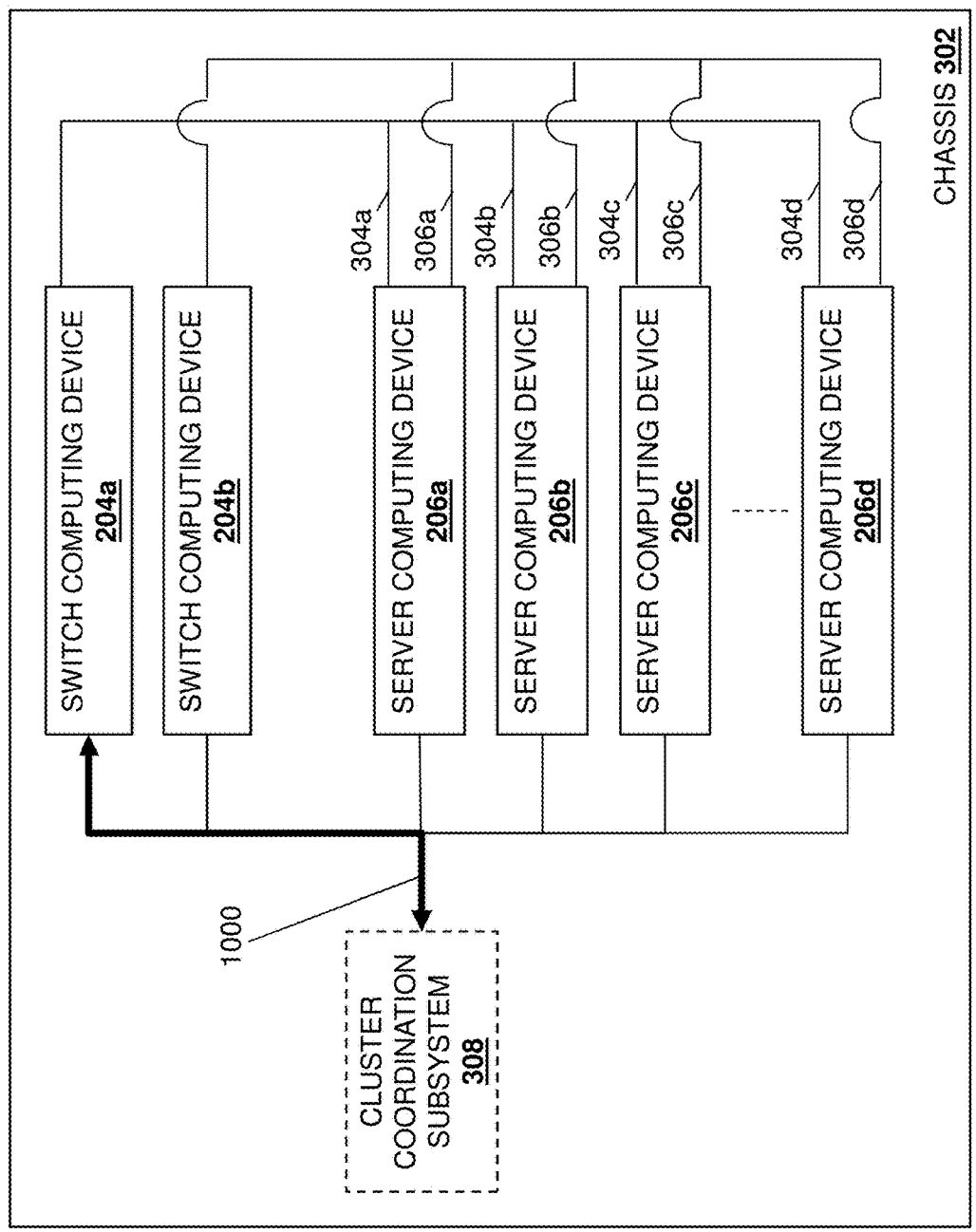
FIG. 10A is a schematic view illustrating an embodiment of the networking fabric update system of FIGS. 2 and 3A operating during the method of FIG. 5.

With reference to FIG. 10A, in one example, and in response to determining that the switch computing device 204a is capable of handling the networking traffic being exchanged by the server computing devices 206a-206d in the "current" time period, the cluster coordination subsystem 308 may perform first update operations 1000 during the "current" time period in order to update the switch computing device 204a. As will be appreciated by one of skill in the art in possession of the present disclosure, the first update operations 1000 may include copying an image update file to the switch computing device 204a, switching an active boot loader on the switch computing device 204a to cause the switch computing device 204a to boot to the image update file on its next boot, and then rebooting the switch computing device 204a to cause the switch computing device 204a to perform the update using the image update file.

However, in another example and in response to determining that the switch computing device 204a is capable of handling the networking traffic being exchanged by the server computing devices 206a-206d in a "subsequent" time period, the cluster coordination subsystem 308 may perform first update operations 1000 during the "subsequent" time period in order to update the switch computing device 204a. Similarly as discussed above, the first update operations 1000 may include copying an image update file to the switch computing device 204a, switching an active boot loader on the switch computing device 204a to cause the switch computing device 204a to boot to the image update file on its next boot, and then rebooting the switch computing device 204a to cause the switch computing device 204a to perform the update using the image update file. Furthermore, such "scheduled" switch computing device updates may provide for further efficiencies in switch computing device updates.

For example, in response to determining that the switch computing device 204a is capable of handling the networking traffic being exchanged by the server computing devices 206a-206d in a "subsequent" time period, the cluster coordination subsystem 308 may copy the image update file to the switch computing device 204a prior to the "subsequent" time period discussed above (i.e., in which the switch computing device 204a is rebooted to perform the update), while the switching of the active boot loader on the switch computing device 204a and the rebooting the switch computing device 204a may be performed during the "subsequent" time period to cause the switch computing device 204a to perform the update using the image update file. As will be appreciated by one of skill in the art in possession of the present disclosure, the copying of the image update file to the switch computing device 204a prior to the "subsequent" time period discussed above allows for the performance of relatively time-consuming operations (e.g., update copying operations typically require approximately 15-20 minutes) prior to the "subsequent" time period, reducing the time required to perform the update during the "subsequent" time period (e.g., active boot loader switching, reboot, and update operations typically require approximately 3-4 minutes).

In another embodiment, with reference to the example of the computing device configuration 310 discussed above with reference to FIG. 3B, the cluster coordination subsystem 314 may have determined that the computing device configuration 310 provides a "non-converged" networking configuration that includes a respective link provided between the switch computing device 204a and each of the server computing devices 206a-206d, a respective link provided between the switch computing device 204b and each of the server computing devices 206a-206d, a respective link provided between the switch computing device 204c and each of the server computing devices 206a-206d, a respective link provided between the switch computing device 204d and each of the server computing devices 206a-206d, with each of the switch computing devices 204a and 204b configured to exchange storage traffic (e.g., via a respective storage network) via its respective first link to each server computing device 206a-206d, and each of the switch computing devices 204c and 204d configured to exchange management traffic (e.g., via a respective management network) via its respective link to each server computing device 206a-206d As will be appreciated by one of skill in the art in possession of the present disclosure, such a "non-converged" networking topology provides two "sets" of switch computing devices 204a/204b and 204c/204d to update. As such, the cluster coordination subsystem 314 may use the workload operation forecast for the server computing devices 206a-206d to determine whether one of the switch computing devices 204a and 204b is capable of handling the storage traffic being exchanged by the server computing devices 206a-206d in the "current" time period and whether one of the switch computing devices 204c and 204d is capable of handling the management traffic being exchanged by the server computing devices 206a-206d in the "current" time period (e.g., if the workload operation forecast for the server computing devices 206a-206d in the "current" time period is below a workload threshold for those switch computing devices). If one of the switch computing devices 204a and 204b is not capable of handling the storage traffic being exchanged by the server computing devices 206a-206d in the "current" time period and/or one of the switch computing devices 204c and 204d is not capable of handling the management traffic being exchanged by the server computing devices 206a-206d in the "current" time period, the cluster coordination subsystem 314 may determine a "subsequent" time period in which one of the switch computing devices 204a and 204b is capable of handling the storage traffic being exchanged by the server computing devices 206a-206d and one of the switch computing devices 204c and 204d is capable of handling the management traffic being exchanged by the server computing devices 206a-206d (e.g., a "subsequent" time period in which the workload operation forecast for the server computing devices 206a-206d is below a workload threshold for those switch computing devices).

Figure 11A:
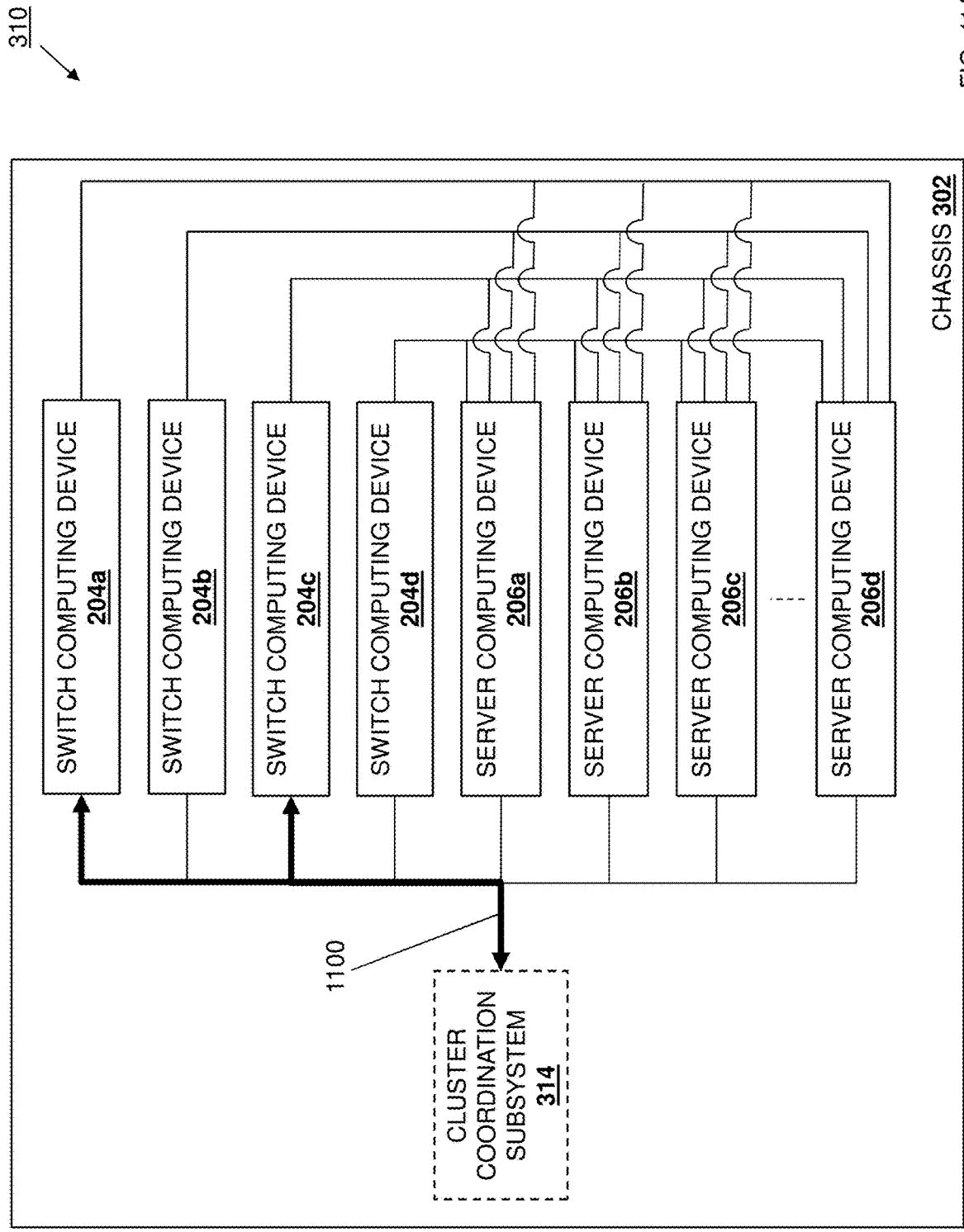
FIG. 11A is a schematic view illustrating an embodiment of the networking fabric update system of FIGS. 2 and 3B operating during the method of FIG. 5.

With reference to FIG. 11A, in one example and in response to determining that the switch computing device 204a is capable of handling the storage traffic being exchanged by the server computing devices 206a-206d in the "current" time period and that the switch computing device 204c is capable of handling the management traffic being exchanged by the server computing devices 206a-206d in the "current" time period, the cluster coordination subsystem 308 may perform first update operations 1100 during the "current" time period in order to update the switch computing devices 204a and 204c. As will be appreciated by one of skill in the art in possession of the present disclosure, the first update operations 1000 may include copying an image update file to the switch computing devices 204a and 204c, switching an active boot loader on the switch computing devices 204a and 204c to cause the switch computing devices 204a and 204c to boot to the image update file on its next boot, and then rebooting the switch computing devices 204a and 204c to cause the switch computing devices 204a and 204c to perform the updates using the image update file. As will be appreciated by one of skill in the art in possession of the present disclosure, the updating of the switch computing devices 204a and 204c may be performed concurrently during the "current" time period for further efficiencies, although the updating of the switch computing devices 204a and 204c at different times will fall within the scope of the present disclosure as well.

However, in another example and in response to determining that the switch computing device 204a is capable of handling the storage traffic being exchanged by the server computing devices 206a-206d in a "subsequent" time period and that the switch computing device 204c is capable of handling the management traffic being exchanged by the server computing devices 206a-206d in a "subsequent" time period, the cluster coordination subsystem 308 may perform the first update operations 1100 during the "subsequent" time period in order to update the switch computing devices 204a and 204c. Similarly as discussed above, the first update operations 1100 may include copying an image update file to the switch computing devices 204a and 204c, switching an active boot loader on the switch computing devices 204a and 204c to cause the switch computing devices 204a and 204c to boot to the image update file on its next boot, and then rebooting the switch computing devices 204a and 204c to cause the switch computing devices 204a and 204c to perform the update using the image update file. As will be appreciated by one of skill in the art in possession of the present disclosure, the updating of the switch computing devices 204a and 204c may be performed concurrently during the "subsequent" time period for further efficiencies, although the updating of the switch computing devices 204a and 204c at different times will fall within the scope of the present disclosure as well. Furthermore, such "scheduled" switch computing device updates may provide for further efficiencies in switch computing device updates.

For example, in response to determining that the switch computing device 204a is capable of handling the storage traffic being exchanged by the server computing devices 206a-206d in a "subsequent" time period and that the switch computing device 204c is capable of handling the management traffic being exchanged by the server computing devices 206a-206d in a "subsequent" time period, the cluster coordination subsystem 308 may copy the image update files to the switch computing devices 204a and 204c prior to the "subsequent" time period discussed above (i.e., in which the switch computing devices 204a and 204c are rebooted to perform the update), while the switching of the active boot loader on the switch computing devices 204a and 204c and the rebooting the switch computing devices 204a and 204c are performed during the "subsequent" time period to cause the switch computing devices 204*a* and 204*c* to perform the update using the image update file. As will be appreciated by one of skill in the art in possession of the present disclosure, the copying of the image update file to the switch computing devices 204*a* and 204*c* prior to the "subsequent" time period discussed above allows for the performance of relatively time-consuming operations (e.g., update copying operations typically require approximately 15-20 minutes) prior to the "subsequent" time period, reducing the time required to perform the update during the "subsequent" time period (e.g., active boot loader switching, reboot, and update operations typically require approximately 3-4 minutes).

The method 500 then proceeds to block 508 where the cluster coordination subsystem updates a second subset of the switch devices. In an embodiment, at block 508 and following the updating of the first subset of switch computing devices 204 at block 506, the cluster coordination subsystem may operate to update a second subset of the switch computing devices. As will be appreciated by one of skill in the art in possession of the present disclosure, the updating of different subsets of the switch computing devices 204 at different times allows at least one subset of the switch computing devices 204 to provide the networking fabric and exchange networking traffic with the server computing devices 206 while another subset of the switch computing devices 204 are updated. Furthermore, the use of the workload operations forecast for the server computing devices 206 to update the first subset of switch computing devices 204 may consider the update of the second subset of switch computing devices 204 as well. For example, the cluster coordination subsystem may use the workload operation forecast to determine that each subset of switch computing devices that is to-be updated during different time periods is capable of exchanging the networking traffic forecast for the server computing devices 206 in its respective time period. As such, the updating of the first subset of switch computing devices and the second subset of switch computing devices (as well as any other subset(s) of switch computing devices) may be performed during the same time period (e.g., the same "current" time period, the same "subsequent" time period, etc.) or during different time period (e.g., the "current" time period and "subsequent" time period(s)).

Figure 10B:
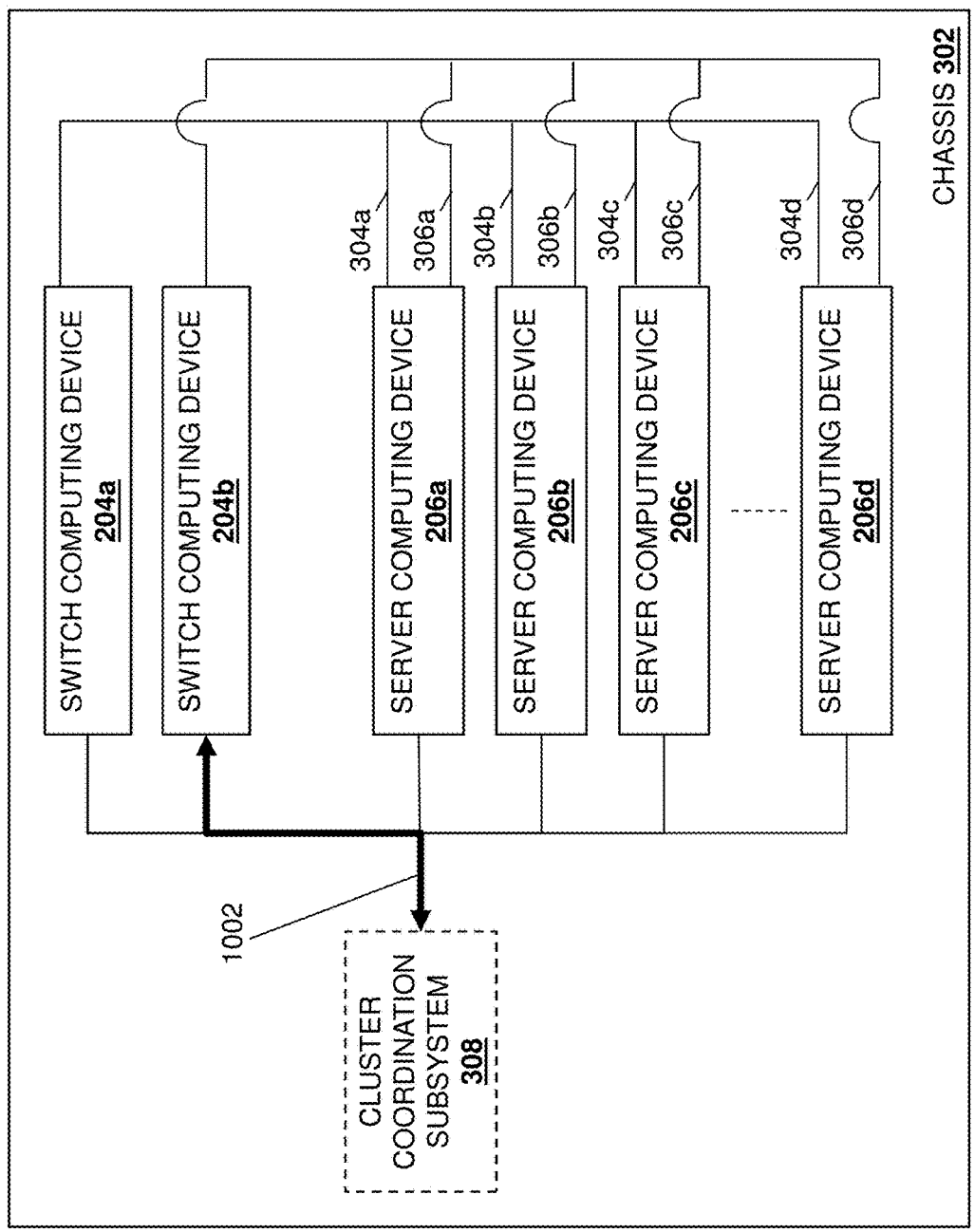
FIG. 10B is a schematic view illustrating an embodiment of the networking fabric update system of FIGS. 2 and 3A operating during the method of FIG. 5.

As such, with reference to FIG. 10B, the cluster coordination subsystem 308 may perform second update operations 1002 following the completion of the first update operations 1000 in order to update the switch computing device 204*b*. Similarly as discussed above, the second update operations 1002 may include copying an image update file to the switch computing device 204*b*, switching an active boot loader on the switch computing device 204*b* to cause the switch computing device 204*b* to boot to the image update file on its next boot, and then rebooting the switch computing device 204*b* to cause the switch computing device 204*b* to perform the update using the image update file. Furthermore, as discussed above, the updating of the switch computing device 204*b* may be performed during the "current" time period or the subsequent time period(s) discussed above, and may include the "scheduled" switch computing device updates in which the cluster coordination subsystem 308 copies the image update file to the switch computing device 204*b* prior to the "subsequent" time period in which the switch computing device 204*b* is rebooted to perform the update.

Figure 11B:
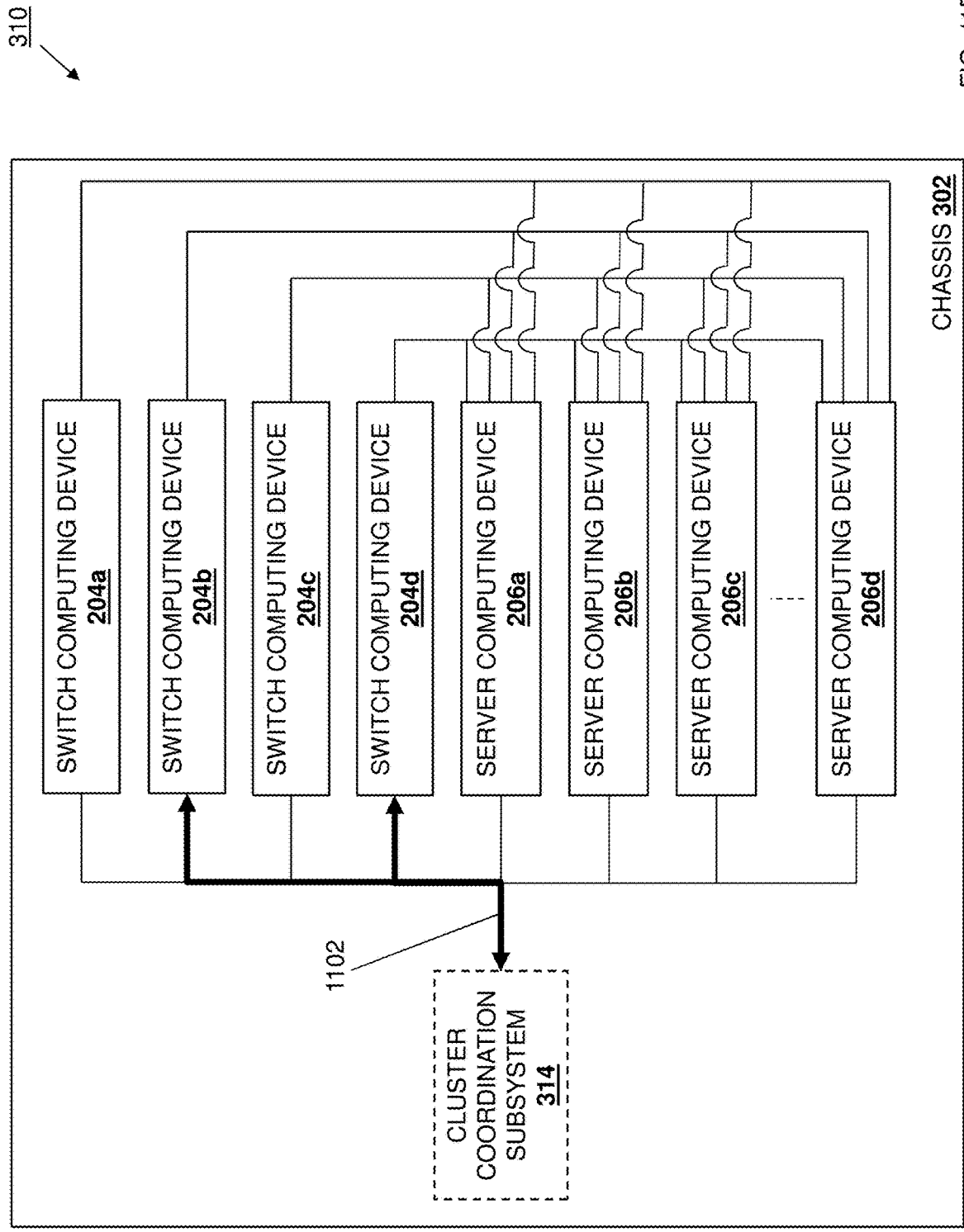
FIG. 11B is a schematic view illustrating an embodiment of the networking fabric update system of FIGS. 2 and 3B operating during the method of FIG. 5.

In another example, with reference to FIG. 11B, the cluster coordination subsystem 314 may perform second update operations 1102 following the completion of the first update operations 1100 in order to update the switch computing devices 204*b* and 204*d*. Similarly as discussed above, the second update operations 1102 may include copying an image update file to the switch computing devices 204*b* and 204*d*, switching an active boot loader on the switch computing devices 204*b* and 204*d* to cause the switch computing devices 204*b* and 204*d* to boot to the image update file on its next boot, and then rebooting the switch computing devices 204*b* and 204*d* to cause the switch computing devices 204*b* and 204*d* to perform the update using the image update file. Furthermore, as discussed above, the updating of the switch computing devices 204*b* and 204*d* may be performed during the "current" time period or the subsequent time period(s) discussed above, and may include the "scheduled" switch computing device updates in which the cluster coordination subsystem 308 copies the image update file to the switch computing devices 204*b* and 204*d* prior to the "subsequent" time period in which the switch computing devices 204*b* and 204*d* are rebooted to perform the updates.

As will be appreciated by one of skill in the art in possession of the present disclosure, while only two subsets of switch computing devices are illustrated and described as being updated according to the teachings of the present disclosure, any number of subsets of switch computing devices may be updated based on the teachings provided here. As such, following block 508, the switch computing devices are updated, and may operate to exchange traffic with the server computing devices. Furthermore, as described in described in U.S. patent application Ser. No. 17/019,523, filed on Sep. 14, 2020, the disclosure of which is incorporated herein by reference, switch computing devices may provide a switch fabric that may be connected to multiple trust domains, and one of skill in the art in possession of the present disclosure will appreciate how the cluster-aware updates described above may be performed across different trust domains while remaining within the scope of the present disclosure as well.

Thus, systems and methods have been described that provide a "cluster-aware" technique for updating a networking fabric that is agnostic of the target switch computing devices that provide the networking fabric (and thus which will operate with switch computing devices from any switch computing device vendor or provider). For example, the networking fabric update system of the present disclosure includes a cluster coordination subsystem coupled to servers and switches. The cluster coordination subsystem identifies a networking topology provided by connections between the servers and switches, and forecasts workload operations for the servers. Based on the networking topology and the workload operations forecast for the servers, the cluster coordination subsystem updates a first subset of the switches and, following the updating of the first subset of the switches, updates a second subset of the switches. The updating of the first subset of the switches may include determining that current workload operations for the servers during a current time period are above a workload threshold for the first subset of the switches, and scheduling and updating the first subset of the switch computing devices during a subsequent time period. As will be appreciated by one of skill in the art in possession of the present disclosure, the networking fabric update system of the present disclosure eliminates manual operations in updating the networking fabric, and prevents the negative effects on the workload being performed by the servers that occurs with conventional networking fabric update systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networking fabric update system, comprising:
a plurality of server computing devices;
a plurality of switch computing devices; and
a cluster coordination subsystem that is coupled to each of the plurality of server computing devices and each of the plurality of switch computing devices, wherein the cluster coordination subsystem includes one or more processors that are configured to:
identify a networking topology provided by connections between the plurality of server computing devices and the plurality of switch computing devices;
forecast workload operations for the plurality of server computing devices;
update, based on the networking topology and the workload operations forecast for the plurality of server computing devices, a first subset of the plurality of switch computing devices; and
update, following the updating of the first subset of the plurality of switch computing devices, a second subset of the plurality of switch computing devices.

2. The system of claim 1, wherein the networking topology provided by connections between the plurality of server computing devices and the plurality of switch computing devices includes one of: a fully-converged networking topology or a non-converged networking topology.

3. The system of claim 1, wherein the forecasting the workload operations for the plurality of server computing devices includes:
monitoring at least one Network Interface Controller (NIC) device in each server computing device; and
forecasting, based on network traffic provided via the at least one Network Interface Controller (NIC) device in each server computing device, the workload operations for the plurality of server computing devices.

4. The system of claim 1, wherein the forecasting the workload operations for the plurality of server computing devices includes:
accessing a historical workload operation database that includes historical workload operations for the plurality of server computing devices; and
forecasting, based on the historical workload operations for the plurality of server computing devices, the workload operations for the plurality of server computing devices.

5. The system of claim 1, wherein the updating the first subset of the plurality of switch computing devices based on the networking topology and the workload operations forecast for the plurality of server computing devices includes:
determining that current workload operations for the plurality of server computing devices during a current time period are above a workload threshold for the first subset of the plurality of switch computing devices;
scheduling a subsequent time period for performing the updating the first subset of the plurality of switch computing devices; and
updating the first subset of the plurality of switch computing devices during the subsequent time period.

6. The system of claim 5, wherein the cluster coordination subsystem is configured to:
provide switch computing device update information on each of the first subset of the plurality of switch computing devices prior to the subsequent time period.

7. An Information Handling System (IHS), comprising:
a processing system that includes one or more processors; and
a memory system that is coupled to the processing system and that includes instructions that, when executed by the one or more processors, cause the processing system to provide a networking fabric update engine that is configured to:
identify a networking topology provided by connections between a plurality of server computing devices and a plurality of switch computing devices;
forecast workload operations for the plurality of server computing devices;
update, based on the networking topology and the workload operations forecast for the plurality of server computing devices, a first subset of the plurality of switch computing devices; and
update, following the updating of the first subset of the plurality of switch computing devices, a second subset of the plurality of switch computing devices.

8. The IHS of claim 7, wherein the networking topology provided by connections between the plurality of server computing devices and the plurality of switch computing devices includes one of: a fully-converged networking topology or a non-converged networking topology.

9. The IHS of claim 7, wherein the forecasting the workload operations for the plurality of server computing devices includes:
monitoring at least one Network Interface Controller (NIC) device in each server computing device; and
forecasting, based on network traffic provided via the at least one Network Interface Controller (NIC) device in each server computing device, the workload operations for the plurality of server computing devices.

10. The IHS of claim 7, wherein the forecasting the workload operations for the plurality of server computing devices includes:
accessing a historical workload operation database that includes historical workload operations for the plurality of server computing devices; and
forecasting, based on the historical workload operations for the plurality of server computing devices, the workload operations for the plurality of server computing devices.

11. The IHS of claim 7, wherein the updating the first subset of the plurality of switch computing devices based on the networking topology and the workload operations forecast for the plurality of server computing devices includes:
determining that current workload operations for the plurality of server computing devices during a current time period are above a workload threshold for the first subset of the plurality of switch computing devices;
scheduling a subsequent time period for performing the updating the first subset of the plurality of switch computing devices; and
updating the first subset of the plurality of switch computing devices during the subsequent time period.

12. The IHS of claim 11, wherein the cluster coordination subsystem is configured to:
provide switch computing device update information on each of the first subset of the plurality of switch computing devices prior to the subsequent time period.

13. The IHS of claim 7, wherein the first subset of the plurality switch computing devices include a first management networking switch device providing access to a management network and a first storage networking switch device providing access to a storage network, and wherein the second subset of the plurality switch computing devices include a second management networking switch device providing access to the management network and a second storage networking switch device providing access to the storage network.

14. A method for updating a networking fabric, comprising:

identifying, by one or more processors included in a cluster coordination subsystem, a networking topology provided by connections between a plurality of server computing devices and a plurality of switch computing devices;

forecasting, by the one or more processors included in the cluster coordination subsystem, workload operations for the plurality of server computing devices;

updating, by the one or more processors included in the cluster coordination subsystem based on the networking topology and the workload operations forecast for the plurality of server computing devices, a first subset of the plurality of switch computing devices; and updating, by the one or more processors included in the cluster coordination subsystem following the updating of the first subset of the plurality of switch computing devices, a second subset of the plurality of switch computing devices.

15. The method of claim 14, wherein the networking topology provided by connections between the plurality of server computing devices and the plurality of switch computing devices includes one of: a fully-converged networking topology or a non-converged networking topology.

16. The method of claim 14, wherein the forecasting the workload operations for the plurality of server computing devices includes:

monitoring at least one Network Interface Controller (NIC) device in each server computing device; and forecasting, based on network traffic provided via the at least one Network Interface Controller (NIC) device in each server computing device, the workload operations for the plurality of server computing devices.

17. The method of claim 14, wherein the forecasting the workload operations for the plurality of server computing devices includes:

accessing a historical workload operation database that includes historical workload operations for the plurality of server computing devices; and forecasting, based on the historical workload operations for the plurality of server computing devices, the workload operations for the plurality of server computing devices.

18. The method of claim 14, wherein the updating the first subset of the plurality of switch computing devices based on the networking topology and the workload operations forecast for the plurality of server computing devices includes:

determining that current workload operations for the plurality of server computing devices during a current time period are above a workload threshold for the first subset of the plurality of switch computing devices;

scheduling a subsequent time period for performing the updating the first subset of the plurality of switch computing devices; and updating the first subset of the plurality of switch computing devices during the subsequent time period.

19. The method of claim 18, further comprising:

providing, by the cluster coordination subsystem, switch computing device update information on each of the first subset of the plurality of switch computing devices prior to the subsequent time period.

20. The method of claim 14, wherein the first subset of the plurality switch computing devices include a first management networking switch device providing access to a management network and a first storage networking switch device providing access to a storage network, and wherein the second subset of the plurality switch computing devices include a second management networking switch device providing access to the management network and a second storage networking switch device providing access to the storage network.

* * * * *